(12) United States Patent
Lee et al.

(10) Patent No.: US 11,388,278 B2
(45) Date of Patent: *Jul. 12, 2022

(54) DISPLAY DEVICE

(71) Applicant: Samsung Display Co., Ltd., Yongin (KR)

(72) Inventors: Tae Hee Lee, Hwaseong-si (KR); Seock Hwan Kang, Seoul (KR); Joon Hak Oh, Seongnam-si (KR); Jong Seo Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,504

(22) Filed: Jul. 2, 2020

(65) Prior Publication Data

US 2020/0336579 A1 Oct. 22, 2020

Related U.S. Application Data

(63) Continuation of application No. 16/250,210, filed on Jan. 17, 2019, now Pat. No. 10,735,571, which is a (Continued)

(30) Foreign Application Priority Data

May 7, 2013 (KR) .................. 10-2013-0051316

(51) Int. Cl.
*G06F 1/16* (2006.01)
*H04M 1/03* (2006.01)
(Continued)

(52) U.S. Cl.
CPC ............ *H04M 1/03* (2013.01); *G06F 1/1688* (2013.01); *H04M 1/035* (2013.01);
(Continued)

(58) Field of Classification Search
CPC .... H04M 1/03; H04M 1/035; H04M 2250/22; G02F 1/133314; H04R 1/025; H04R 2499/15; G06F 1/1688
See application file for complete search history.

(56) References Cited

U.S. PATENT DOCUMENTS 6,342,776 B1 * 1/2002 Taylor ..................... H02J 7/32
320/137
6,597,794 B2 * 7/2003 Cole ..................... G06F 1/1616
381/306
(Continued)

FOREIGN PATENT DOCUMENTS

CN 1581891 A 2/2005
CN 1900748 A 1/2007
(Continued)

OTHER PUBLICATIONS

U.S. Appl. No. 16/250,210, filed Jan. 17, 2019.
(Continued)

*Primary Examiner* — Adrian S Wilson
(74) *Attorney, Agent, or Firm* — Cantor Colburn LLP

(57) ABSTRACT

A display device includes: a display panel configured to display an image; a sound element on a rear side of the display panel; and a rear chassis configured to receive the display panel and protect the rear side of the display panel, and including a protruding portion protruding away from the rear side of the display panel and corresponding to the sound element. The sound element includes a pair of electrodes, and a vibration material layer between the electrodes.

17 Claims, 29 Drawing Sheets

Related U.S. Application Data continuation of application No. 15/830,305, filed on Dec. 4, 2017, now Pat. No. 10,205,810, which is a continuation of application No. 14/140,708, filed on Dec. 26, 2013, now Pat. No. 9,854,078.

(51) Int. Cl.
    *H04R 1/02*     (2006.01)
    *G02F 1/1333*   (2006.01)

(52) U.S. Cl.
    CPC ... *G02F 1/133314* (2021.01); *H04M 2250/22* (2013.01); *H04R 1/025* (2013.01); *H04R 2499/15* (2013.01)

(56) References Cited

U.S. PATENT DOCUMENTS

| | | | | |
|---|---|---|---|---|
| 7,151,837 B2* | 12/2006 | Bank | H04R 7/045 | 381/190 |
| 7,565,949 B2* | 7/2009 | Tojo | G06F 1/1605 | 181/148 |
| 7,657,042 B2* | 2/2010 | Miyata | G02F 1/133 | 381/152 |
| 7,798,284 B2* | 9/2010 | Wada | H04M 1/03 | 181/199 |
| 7,826,134 B2* | 11/2010 | Choi | G03B 21/60 | 359/445 |
| 8,107,650 B2* | 1/2012 | Fujiwara | H04R 17/00 | 381/190 |
| 8,275,158 B2 | 9/2012 | Kim et al. | | |
| 8,340,329 B2 | 12/2012 | Ogura et al. | | |
| 8,363,863 B2 | 1/2013 | Andoh et al. | | |
| 8,369,543 B2 | 2/2013 | Suzuki et al. | | |
| 8,401,220 B2* | 3/2013 | Kim | H04R 17/00 | 381/398 |
| 8,426,049 B2* | 4/2013 | Chen | H01M 50/209 | 429/100 |
| 8,526,642 B2* | 9/2013 | Chung | H04R 31/00 | 381/190 |
| 8,934,228 B2 | 1/2015 | Franklin | G06F 1/1652 | 361/679.26 |
| RE45,925 E * | 3/2016 | Tojo | H04R 5/02 | |
| 9,583,692 B2 | 2/2017 | Hayashi et al. | | |
| 9,854,078 B2* | 12/2017 | Lee | H04M 1/03 | |
| 10,205,810 B2* | 2/2019 | Lee | H04M 1/035 | |
| 10,735,571 B2* | 8/2020 | Lee | H04M 1/03 | |
| 2001/0026625 A1* | 10/2001 | Azi | H04R 7/045 | 381/152 |
| 2002/0052216 A1* | 5/2002 | Song | H04M 1/035 | 455/569.1 |
| 2003/0003879 A1* | 1/2003 | Saiki | H04R 1/028 | 455/575.1 |
| 2003/0063432 A1* | 4/2003 | Farrow | G06F 1/181 | 361/679.02 |
| 2003/0096632 A1* | 5/2003 | Kim | H04M 1/035 | 455/550.1 |
| 2004/0252857 A1* | 12/2004 | Lewis | H04R 5/02 | 381/355 |
| 2005/0025330 A1* | 2/2005 | Saiki | H04R 7/04 | 381/388 |
| 2005/0205350 A1* | 9/2005 | Yang | H04R 1/025 | 181/160 |
| 2005/0226455 A1* | 10/2005 | Aubauer | G06F 3/0436 | 381/388 |
| 2006/0039575 A1* | 2/2006 | Wada | H04R 1/025 | 381/152 |
| 2006/0051075 A1* | 3/2006 | Wada | H04R 23/008 | 386/358 |
| 2006/0245613 A1* | 11/2006 | Itoh | H04R 1/02 | 381/388 |
| 2006/0256999 A1* | 11/2006 | Lin | B60R 11/0217 | 381/431 |
| 2007/0019134 A1* | 1/2007 | Park | H04R 17/00 | 349/96 |
| 2007/0030985 A1* | 2/2007 | Cheung | H04R 7/045 | 381/152 |
| 2007/0049326 A1* | 3/2007 | Kim | H01Q 1/243 | 455/550.1 |
| 2007/0071259 A1* | 3/2007 | Tojo | H04R 1/323 | 381/152 |
| 2007/0097073 A1* | 5/2007 | Takashima | G06F 3/016 | 345/156 |
| 2007/0111086 A1* | 5/2007 | Li | H01M 50/20 | 429/97 |
| 2007/0223744 A1* | 9/2007 | Wada | H04R 23/008 | 381/152 |
| 2007/0248236 A1* | 10/2007 | Miyata | H04R 5/04 | 381/152 |
| 2008/0216578 A1 | 9/2008 | Takashima et al. | | |
| 2010/0045612 A1* | 2/2010 | Molne | G06F 3/04142 | 345/173 |
| 2010/0061578 A1* | 3/2010 | Zhou | H04M 1/035 | 381/345 |
| 2010/0259891 A1* | 10/2010 | Tachikawa | G06F 1/1688 | 361/679.55 |
| 2010/0328328 A1 | 12/2010 | Choi et al. | | |
| 2011/0037734 A1* | 2/2011 | Pance | G06F 3/043 | 345/177 |
| 2011/0255727 A1* | 10/2011 | Azuchi | G06F 1/203 | 381/333 |
| 2012/0057730 A1* | 3/2012 | Fujise | H04R 17/00 | 381/190 |
| 2012/0126959 A1 | 5/2012 | Zarrabi et al. | | |
| 2012/0243719 A1* | 9/2012 | Franklin | H04R 1/02 | 381/333 |
| 2013/0045782 A1* | 2/2013 | Simmer | H04M 1/035 | 455/575.8 |
| 2013/0094126 A1* | 4/2013 | Rappoport | G09G 3/3208 | 361/679.01 |
| 2013/0241352 A1 | 9/2013 | Hayashi et al. | | |
| 2013/0328820 A1* | 12/2013 | Kondoh | G06F 1/1626 | 345/173 |
| 2014/0160040 A1* | 6/2014 | Kang | H04R 17/005 | 345/173 |
| 2014/0161293 A1* | 6/2014 | Wang | H04R 1/44 | 381/332 |
| 2015/0010187 A1* | 1/2015 | Lee | H04R 1/028 | 381/333 |
| 2015/0078604 A1* | 3/2015 | Seo | H04R 1/028 | 381/333 |
| 2015/0185963 A1* | 7/2015 | Lee | H02J 50/40 | 345/177 |
| 2019/0182370 A1 | 6/2019 | Lee | H04M 1/03 | |

FOREIGN PATENT DOCUMENTS

| | | |
|---|---|---|
| CN | 101273660 A | 9/2008 |
| CN | 101334691 A | 12/2008 |
| CN | 102004570 A | 4/2011 |
| CN | 102105852 A | 6/2011 |
| EP | 1507438 A3 | 7/2016 |
| JP | 02-176721 A | 7/1990 |
| JP | 2002232992 A | 8/2002 |
| JP | 2005110216 A | 4/2005 |
| JP | 2006060646 A | 3/2006 |
| JP | 2006166029 A | 6/2006 |
| JP | 2007256572 A | 10/2007 |
| JP | 2009100223 A | 5/2009 |
| JP | 2009177751 A | 8/2009 |
| JP | 2012508421 A | 4/2012 |
| KR | 1020060053203 A | 5/2006 |
| KR | 1020070010577 A | 1/2007 |
| KR | 101293558 B1 | 7/2013 |
| KR | 101383702 B1 | 4/2014 |
| WO | 2010054014 A1 | 5/2010 |

(56) References Cited

FOREIGN PATENT DOCUMENTS

WO         2013046909 A1     4/2013
WO         2013051328 A1     4/2013

OTHER PUBLICATIONS

U.S. Appl. No. 15/830,305, filed Dec. 4, 2017, and.
U.S. Appl. No. 14/140,708, filed Dec. 26, 2013.
European Search Report for European Patent Application No. 14159009.1 dated Feb. 20, 2015.

* cited by examiner

DISPLAY DEVICE

This application is a continuation application of U.S. application Ser. No. 16/250,210 filed Jan. 17, 2019, which is a continuation application of U.S. application Ser. No. 15/830,305 filed Dec. 4, 2017 and issued as U.S. Pat. No. 10,205,810 on Feb. 12, 2019, which is a continuation application of U.S. application Ser. No. 14/140,708 filed Dec. 26, 2013 and issued as U.S. Pat. No. 9,854,078 on Dec. 26, 2017, which claims priority to Korean Patent Application No. 10-2013-0051316 filed on May 7, 2013, and all the benefits accruing therefrom under 35 U.S.C. § 119, the entire contents of which are incorporated herein by reference.

BACKGROUND

(a) Field

The invention relates to a display device, and more particularly, to a display device generating a sound or vibration in addition to displaying an image.

(b) Description of the Related Art

Display devices have been developed from a cathode ray tube ("CRT") to various flat panel display devices such as a liquid crystal display ("LCD"), a plasma display panel ("PDP"), an organic light emitting display ("OLED"), an electrowetting display ("EWD"), an electrophoretic display ("EPD"), an embedded micro cavity display ("EMD") and a nano crystal display ("NCD").

Since the LCD which has been in the limelight among the flat panel displays has advantages such as a small size, a light weight and low power consumption, the LCD has gradually received attention as a replacement means capable of overcoming disadvantages of the CRT. The LCD has been installed and used on almost all information processing devices requiring a display device. The LCD is a device in which a liquid crystal panel includes a liquid crystal material is between an upper substrate where a common electrode, a color filter and the like are disposed, and a lower substrate where a thin film transistor, a pixel electrode and the like are disposed. Different electrical potentials are applied to the pixel electrode and the common electrode to form an electric field to change alignment of liquid crystal molecules in the liquid crystal material, thereby controlling transmittance of light to express an image by the LCD.

In the LCD, since the liquid crystal panel is a non-emissive element which does not self-emit light, the LCD further includes a backlight unit for providing the light to the liquid crystal panel from the lower portion of the liquid crystal panel.

In contrast, the OLED among the flat panel displays includes a light emitting diode ("LED") self-emitting light and thus does not use the backlight unit.

SUMMARY

One or more exemplary embodiment of the invention provides a display device having advantages of generating a sound without installing a separate speaker or sensing a touch or an operation without adding a separate touch panel or a touch sensor.

An exemplary embodiment of the invention provides a display device, including: a display panel configured to display an image; a sound element on a rear side of the display panel; and a rear chassis configured to receive the display panel and protect the rear side of the display panel, and including a protruding portion protruding away from the rear side of the display panel and corresponding to the sound element. The sound element includes a pair of electrodes, and a vibration material layer between the electrodes.

An open portion may be defined in the rear chassis and extend along a boundary of the protruding portion.

The open portion may be defined at an inside or outside of the protruding portion.

The protruding portion and the sound element may be in one-to-one correspondence.

The display device may further include a plurality of protruding portions and a plurality of sound elements.

Two or more sound elements may correspond to one protruding portion.

The sound element may be in an inner area of the protruding portion; and the rear chassis may further include a wire connection portion through which a sound signal wire which receives a sound signal from outside the rear chassis extends to the inner area of the protruding portion.

The pair of electrodes of the sound element may include: a first electrode on a first side of the vibration material layer, a second electrode on an opposing second side of the vibration material layer, and an electrode pad defined by a portion of the first or second electrode, the portion extended along a side of the vibration material layer.

The display device may further include a fixing member which is between the sound element and the rear side of the display panel, and attaches the sound element to the rear side of the display panel, where the fixing member includes non-conductive epoxy.

The sound element may further include a plurality of vibration material layers and a plurality of electrodes, the plurality of vibration material layers may be arranged in a multi-layered structure and alternate with the plurality of electrodes, and the plurality of electrodes may be respectively at opposing outermost sides of the sound element and between adjacent vibration material layers.

The sound element may further include an electrode pad defined by a portion of an outermost electrode among the outermost electrodes, the portion extended along an outermost side of a vibration material layer.

The plurality of electrodes may include a first pair of electrodes electrically connected to each other and a second pair of electrodes electrically connected to each other, and the electrodes of the first pair alternate with the electrodes of the second pair.

The display device may further include an amplifier configured to amplify a sound signal applied from outside the sound element; and a sound signal wire transferring the sound signal from the amplifier to the sound element.

The display panel may include a substrate, a printed circuit board and a flexible printed circuit board, the substrate of the display panel may be connected with the printed circuit board through the flexible printed circuit board, and the amplifier may be on the printed circuit board.

The vibration material layer of the sound element may be configured to generate vibration of a non-audible frequency, a change in the non-audible frequency vibration is generated in response to an outside force applied to the sound element, and the change in the non-audible frequency vibration input to a haptic sensing function of a device comprising the display device, generates sensing of the outside force by the haptic sensing function.

The vibration material layer of the sound element may be configured to generate voltage in response to an outside force applied to the sound element, and the generated voltage of the sound element input to a pressure-sensing function of a device comprising the display device, generates sensing of the outside force by the pressure-sensing function.

The vibration material layer of the sound element may be configured to generate a sound wave of a non-audible frequency, the non-audible frequency sound wave of the sound element is changed in response to an external movement applied to the non-audible frequency sound wave, and the changed non-audible frequency sound wave input to an audio-input member for a motion-sensing function of a device comprising the display device, generates sensing of the external movement by the motion-sensing function.

The vibration material layer of the sound element may be configured to generate voltage in response to vibration applied to the sound element, and the voltage input to a charging function of a device comprising the display device, generates charging of a battery which supplies power to the display device.

Another exemplary embodiment of the invention provides a display device, including: a display panel configured to display an image; a sound element on a rear side of the display panel; and a cushion member configured to protect the rear side of the display panel and cover the sound element on the rear side of the display panel. The sound element includes a pair of electrodes, and a vibration material layer between the electrodes.

The display device may further include a window positioned on a viewing side of the display panel.

A concave sound space may be defined inside the cushion member and correspond to the sound element.

The display device may further include a fixing element which is between the sound element and the rear side of the display panel, and attaches the sound element to the rear side of the display panel, where the fixing member includes non-conductive epoxy.

The display device may further include a fixing protrusion which is in the concave sound space, and is between and contacts both the sound element and the cushion member. The fixing protrusion maintains contact of the sound element with the rear side of the display panel.

The sound element may be positioned in the concave sound space.

The display device may further include a protective film between the rear side of the display panel and the sound element.

The pair of electrodes of the sound element may include: a first electrode on a first side of the vibration material layer, a second electrode on an opposing second side of the vibration material layer, and an electrode pad defined by a portion of the first or second electrode, the portion extended along a side of the vibration material layer.

The sound element may further include a plurality of vibration material layers and a plurality of electrodes, the plurality of vibration material layers may be arranged in a multi-layered structure and alternate with the plurality of electrodes, and the plurality of electrodes may be respectively at opposing outermost sides of the sound element and between adjacent vibration material layers.

The sound element may further include an electrode pad defined by a portion of an outermost electrode among the outermost electrodes, the portion extended along an outermost side of a vibration material layer.

The plurality of electrodes may include a first pair of electrodes electrically connected to each other and a second pair of electrodes electrically connected to each other, and the electrodes of the first pair alternate with the electrodes of the second pair.

The display device may further include an amplifier configured to amplify a sound signal applied from outside the sound element; and a sound signal wire which transfers the sound signal from the amplifier to the sound element.

The display panel may include a substrate, a printed circuit board and a flexible printed circuit board, the substrate of the display panel may be connected with the printed circuit board through the flexible printed circuit board, and the amplifier may be on the printed circuit board.

The vibration material layer of the sound element may be configured to generate vibration of a non-audible frequency, a change in the non-audible frequency vibration is generated in response to an outside force applied to the sound element, and the change in the non-audible frequency vibration input to a haptic sensing function of a device comprising the display device, generates sensing of the outside force by the haptic sensing function.

The vibration material layer of the sound element is configured to generate voltage in response to an outside force applied to the sound element, and the generated voltage of the sound element input to a pressure-sensing function of a device comprising the display device, generates sensing of the outside force by the pressure-sensing function.

The vibration material layer of the sound element is configured to generate a sound wave of a non-audible frequency, the non-audible frequency sound wave of the sound element is changed in response to an external movement applied to the non-audible frequency sound wave, and the changed non-audible frequency sound wave input to an audio-input member for a motion-sensing function of a device comprising the display device, generates sensing of the external movement by the motion-sensing function.

The vibration material layer of the sound element is configured to generate voltage in response to vibration applied to the sound element, and the voltage input to a charging function of a device comprising the display device, generates charging of a battery which supplies power to the display device.

According to one or more exemplary embodiment of the invention, a sound is provided in a display device by a piezo material (for example, a material such as PVDF or PZT) receiving an electric field to provide the sound. Further, when a non-audible frequency vibration such as from a user touch is applied to the display device, the touch may be sensed by feeding back the user's touch and thus a separate touch screen for a touch-display device is not necessary. Further, external movement to the display device may be sensed by employing the Doppler's effect and thus a separate operational sensor for a display device may not be necessary.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
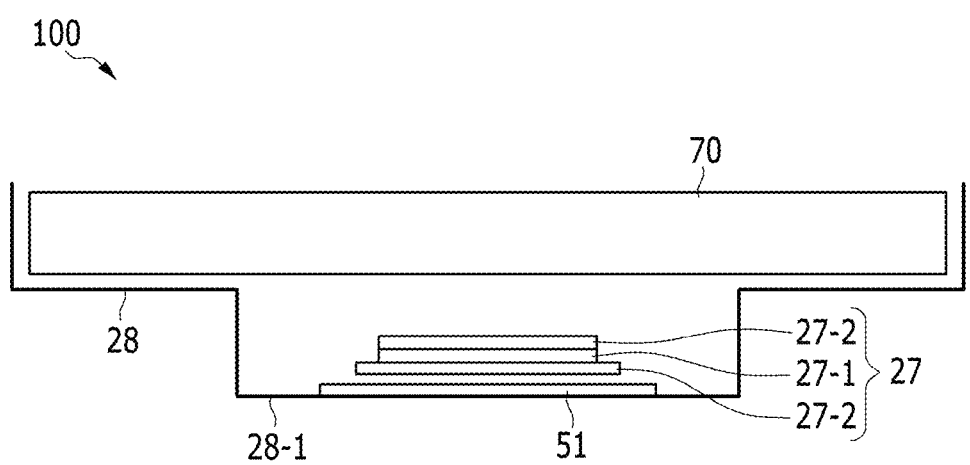
FIG. 1 is a cross-sectional view illustrating an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. As used herein, connected may refer to elements being physically and/or electrically connected to each other. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "below," "lower," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "lower" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Display devices have a minimal function of displaying an image, and as a result, in order to provide a sound, a separate speaker is employed by a display device.

Touch sensing display devices have been developed which display an image and provide a sound. In order to sense a touch or an operation in the touch sensing display device, a touch panel including a touch sensor is additionally provided with a display panel, or a separate touch sensor is disposed in the display panel, thereby undesirably increasing costs of the touch sensing display device. Therefore, there remains a need for an improved sound producing and touch sensing display device which does not undesirably increase costs thereof.

Hereinafter, an exemplary embodiment of a display device according to the invention will be described in detail with reference to FIGS. 1 and 2.

Figure 2:
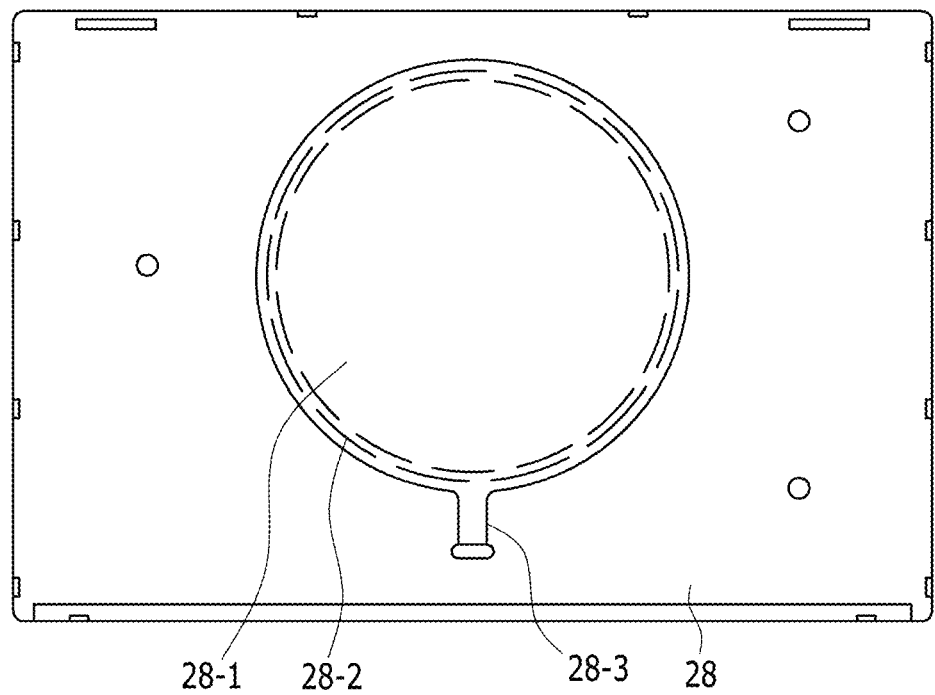
FIG. 2 is a plan view illustrating an exemplary embodiment of a rear of the display device according to the invention.

FIG. 1 is a cross-sectional view illustrating an exemplary embodiment of a display device according to the invention, and FIG. 2 is a plan view illustrating an exemplary embodiment of a rear of the display device according to the invention.

The display device 100 includes a display panel 70, a rear chassis 28 receiving the display panel 70, protecting the rear of the display panel and including a protruding portion 28-1, and a sound element 27 positioned in a space defined by the protruding portion 28-1.

The display panel 70 of the exemplary embodiment of FIG. 1 may be a self-emitting display panel or a non-emissive display panel receiving light from a light source to display an image. The self-light emitting display panel includes an organic light emitting panel and the like, and the non-emissive display panel includes a liquid crystal panel and the like. The non-emissive display panel may include a backlight unit.

The display panel 70 includes a thin film transistor ("TFT") substrate configured by a plurality of TFTs. The TFT substrate includes a transparent insulation substrate, the TFTs disposed in a matrix form, a data line connected to a source terminal of the TFT, and a gate line connected to a gate terminal of the TFT on the transparent insulation substrate. In addition, a pixel electrode including transparent indium tin oxide ("ITO") as a conductive material may be connected to a drain terminal of the TFTs. A detailed structure of the display panel 70 may be various for each kind of display panel and each exemplary embodiment.

The display panel 70 of FIG. 1 may represent a display panel assembly. That is, the display panel assembly 70 of FIG. 1 may include a driver including an integrated circuit ("IC") and a flexible printed circuit board ("FPCB") to drive a display panel, in addition to the display panel.

When the data line and the gate line of the display panel 70 are connected to the FPCB, an electric signal is input from the FPCB to the display panel 70. The electric signal such as an image signal and a scanning signal, is transferred to a source terminal and a gate terminal of the TFT. The TFT is turned on or off according to the scanning signal applied to the gate terminal through the gate line and thus the image signal applied to the source terminal through the data line is transferred to or blocked from the drain terminal of the TFT. The FPCB receives the image signal from the outside of the display panel to apply respective driving signals to the data line and the gate line of the display panel.

The FPCB generates an image signal and a scanning signal which are signals for driving the display device 100, and a plurality of timing signals for applying the image signal and the scanning signal at an appropriate timing. The FPCB applies the image signal and the scanning signal to the gate line and the data line of the display panel 70, respectively. In addition, an exemplary embodiment of the FPCB according to the invention may include an amplifier (see FIG. 23) amplifying and transferring a sound signal. The amplifier receives the sound signal received from the outside and amplifies the received sound signal and transfers the amplified sound signal to the sound element 27 through a sound signal wire (not shown).

The display device 100 may further include a mold frame (not shown), and the display panel 70 may be fixed in the display device 100 by the mold frame. In addition, the display device 100 may further include a top chassis for maintaining a position of the display panel 70 to reduce or effectively prevent deviation in a front direction (e.g., towards a viewing side) of the display device 100.

The rear chassis 28 which protects a rear of the display panel 70 is included in the display device 100. The rear chassis 28 may be called a bottom chassis or a back chassis of the display device 100, and is positioned at the rear of the display panel 70 to receive and protect the display panel 70. According to an exemplary embodiment of the display device 100, the rear chassis 28 is coupled with the mold frame or the top chassis of the display device, to protect the display panel 70.

The rear chassis 28 includes a protruding portion 28-1 protruding in a rear direction opposite to the front direction. A protruding degree (e.g., cross-sectional depth) and a width of the protruding portion 28-1 are enlarged in FIG. 1 for clarity, but actually, the protruding degree may not be easily recognized with the naked eye of a viewer of the display device 100.

The protruding portion 28-1 defines an area in which the sound element 27 is positioned and may serve as a soundbox which amplifies a sound provided from the sound element 27. The sound element 27 may include a vibration material layer 27-1.

The sound element 27 may be adhered to an inside of the protruding portion 28-1 of the rear chassis 28 by a fixing member such as an adhesive 51. The adhesive 51 may include an adhesive including non-conductive epoxy, but is not limited thereto. Where the adhesive includes non-conductive epoxy, in order to dry the adhesive 51, the sound element 27 may be heated or naturally dried. When the sound element 27 is heated, a characteristic of the vibration material layer 27-1 deteriorates. The deterioration has been verified by a reliability test result. Accordingly, when attaching the sound element 27 to the rear chassis 28, the sound element 27 may be naturally dried even though extra time is required as compared to using heat to attach the sound element 27. However, where sound quality provided from the sound element 27 is not important (for example, a receiver providing an opponent sound on a telephone and the like), the sound element 27 may be attached with the adhesive 51 by applying the heat.

The sound element 27 further includes a pair of electrodes 27-2, and the vibration material layer 27-1 is positioned between the electrodes. The vibration material layer 27-1 includes a piezo material which is vibrated by an electric field provided from the pair of electrodes 27-2 respectively positioned above and below the vibration material layer 271-1. The piezo material may include, but is not limited to, poly vinylidene fluoride ("PVDF") or lead zirconium titanite ceramics ("PZT").

The PVDF includes polyvinylidene fluoride trifluoroethylene (PVDF-TrFE) and has a material characteristic such that the PVDR is easily manufactured in a flexible film form. In contrast, manufacturing the PZT in a flexible film form is difficult as compared with that of the PVDF, and achieving a flexible characteristic may also be difficult. However, in an exemplary embodiment, in order that the PZT is used as the vibration material layer and formed in a film form, the PZT may be mixed with the PVDF (or PVDF-TrFE).

As discussed above, the pair of electrodes 27-2 is positioned at opposing sides of the vibration material layer 27-1, respectively, and provides an electric field to the vibration material layer 27-1. The electrodes 27-2 may include various conductive materials such as a transparent conductor such as ITO and indium zinc oxide ("IZO"), opaque metal, conducting polymer and carbon nanotube ("CNT").

The sound element 27 is attached to the inside of the protruding portion 28-1 of the rear chassis 28 and vibrates. The protruding portion 28-1 also vibrates due to the vibration of the sound element 27. As a result, there is a problem in that the vibration of the protruding portion 28-1 translates into vibration of an entire of the rear chassis 28, and the vibration may be further transferred to the display panel 70.

Since the vibration is determined according to a material of the rear chassis 28 and a size of the vibration provided from the sound element 27, when the actual vibration of the sound element 27 is relatively small, the problem may not occur. In order to remove a concern about the vibration provided from the sound element 27, an open portion 28-2 positioned on an outer boundary of the protruding portion 28-1 is defined in the protruding portion 28-1 of the rear chassis 28. The open portion 28-2 may otherwise be referred to as a slit or recess.

A plurality of open portions 28-2 may be defined in the protruding portion 28-1 of the rear chassis 28. A single discrete open portion 28-2 may extend partially or completely through a cross-sectional thickness of the portion of the rear chassis 28 in which the open portion 28-2 is defined.

The open portion 28-2 serves to buffer the vibration of the sound element 27 so that the vibration is not transferred to the rear chassis 28. The open portion 28-2 may also improve a movable range of the rear chassis protruding portion 28-1 so that the protruding portion 28-1 faithfully serves as a soundbox during vibration. Further, sound is discharged to the outside through the open portion 28-2 and thus the user may easily hear the sound.

The open portion 28-2 has a parallel structure with a part of the boundary (e.g., an outer edge) of the protruding portion 28-1. A length in an extending direction of the open portion 28-2 and a width thereof, may have various structures according to various exemplary embodiments. The open portion 28-2 is disposed at a regular or uniform distance from an adjacent open portion 28-2. A group of open portions 28-2 are collectively defined in a shape substantially parallel to the boundary of the protruding portion 28-1. One or more groups of the open portions 28-2 may be disposed proximate the boundary of the protruding portion 28-1. In one exemplary embodiment, two groups of open portions 28-2 are shown in FIG. 2, but the invention is not limited thereto or thereby. While 28-2 is used to indicate a single, discrete open portion in the figures, it will be understood that 28-2 may be used to refer to a collective group of open portions 28-2.

Referring to the plan view of FIG. 2, the open portion 28-2 is positioned in the protruding portion 28-1. The open portion 28-2 may be positioned outside of the protruding portion 28-1 in the plan view, according to an alternative exemplary embodiment.

Referring to FIG. 2, the protruding portion 28-1 has a circular planar structure. A wire connection portion 28-3 linearly extends from the circular structure of the protruding portion 28-1. The wire connection portion 28-3 is a portion where the sound signal wire transferring the sound signal transferred from the amplifier to the sound element 27 is connected to the inside of the protruding portion 28-1. That is, the wire connection portion 28-3 may define a space which is connected to the space at the inside of the protruding portion 28-1, such that the sound signal wire extends from the inside of the protruding portion 28-1 to outside of the rear chassis 28 or other element of the display device 100 (refer to FIG. 23, for example). The wire connection portion 28-3 may protrude in a cross-sectional direction at substantially a same distance as the protruding portion 28-1, or may protrude at a smaller distance than the protruding portion 28-1 according to an alternative exemplary embodiment.

According to an exemplary embodiment, a window member 30 (refer to FIG. 14) including tempered glass or plastic may be disposed at the front of the display panel 70. The window member 30 reduces or effectively prevents damage to the front side of the display panel 70 due to a force from outside the display panel 70. In one exemplary embodiment of a device employing the display panel 70, the window member 30 may configure an outer surface of a display side of a portable electronic device such as a portable telephone or other electronic device.

In the exemplary embodiment of FIG. 1, only one sound element 27 is illustrated, but the number of sound elements 27 may be two or more.

Hereinafter, another exemplary embodiment of the invention will be described with reference to FIGS. 3 and 4.

Figure 3:
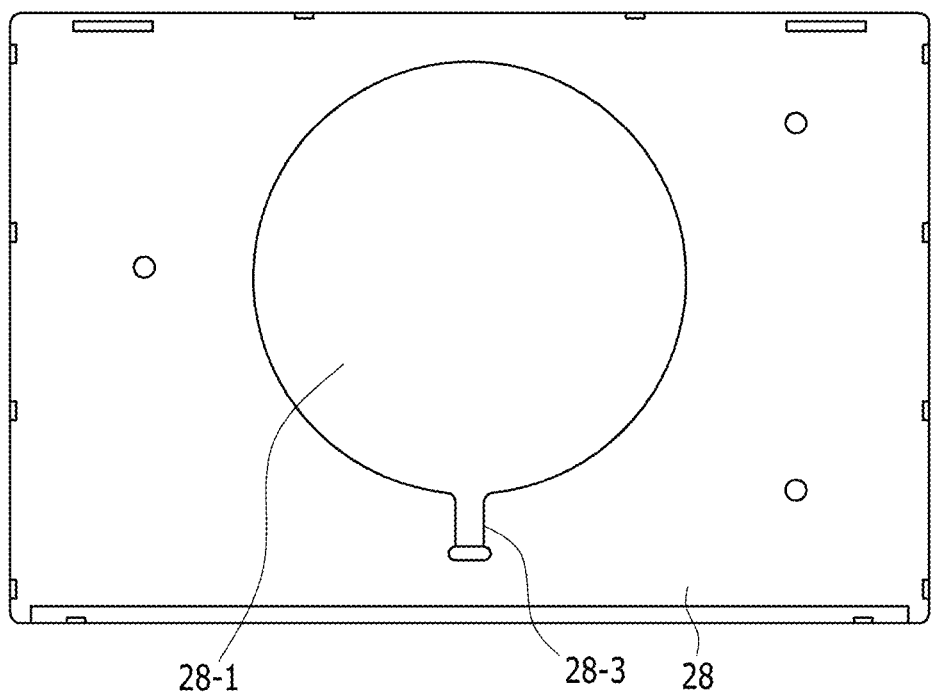
FIGS. 3 and 4 are plan views illustrating alternative exemplary embodiments of a rear of the display device according to the invention.
Figure 4:
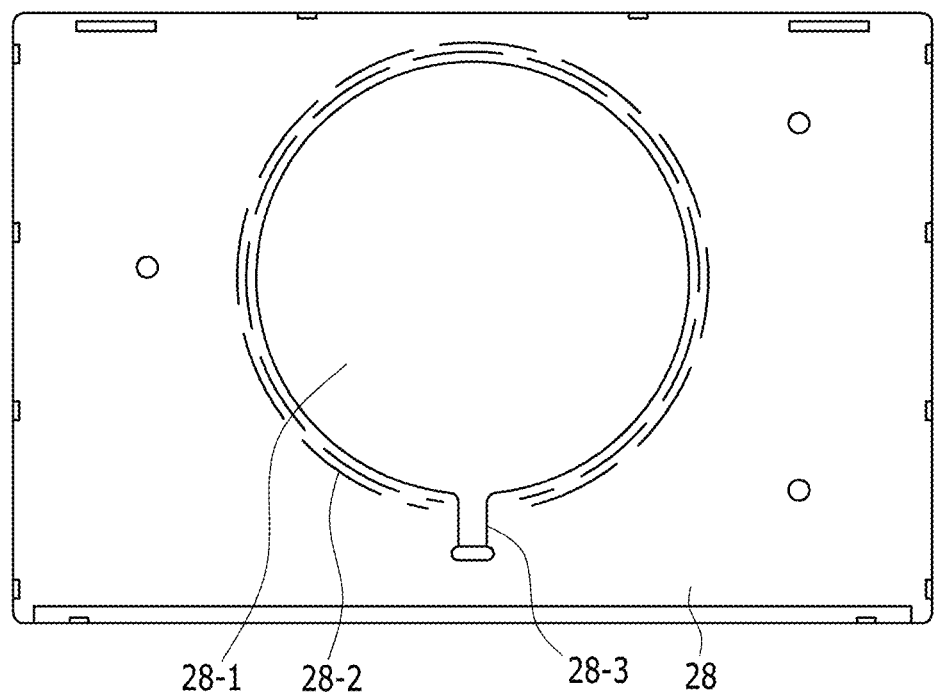

FIGS. 3 and 4 are plan views illustrating alternative exemplary embodiments of a display device according to the invention.

The exemplary embodiments of FIGS. 3 and 4 shows structures in which the open portion 28-2 is different from that of the exemplary embodiment of FIG. 2.

First, the exemplary embodiment of FIG. 3 will be described.

The display device 100 of FIG. 3 includes the protruding portion 28-1 and the wire connection portion 28-3 at the rear chassis 28, but does not include the open portion 28-2.

In contrast, the display device 100 of FIG. 4 includes the protruding portion 28-1, the open portion 28-2 and the wire connection portion 28-3 at the rear chassis 28. The open portion 28-2 is disposed outside of the protruding portion 28-1 in the plan view, unlike the exemplary embodiment of FIG. 2. The open portion 28-2 may be defined partially or completely through a cross-sectional thickness of a plate portion (e.g., where reference numeral 28 in FIG. 1 points) of the rear chassis 28 from which the protruding portion 28-1 extends. The open portion 28-2 of FIG. 4 may be on a different plane of the rear chassis 28 than a bottom plate portion of the protruding portion 28-1, while the open portion 28-2 of FIG. 2 is in a same plane as the bottom plate portion of the protruding portion 28-1. The open portion 28-2 is parallel to the boundary of the protruding portion 28-1 similar to the exemplary embodiment of FIG. 2, and the length and the width of a single, discrete open portion 28-2 may be various according to exemplary embodiments of the invention.

Hereinafter, sound characteristics of the exemplary embodiment of the display device 100 according to the invention will be described with reference to FIGS. 5 to 11.

First, a vibration characteristic at a predetermined position of the rear chassis 28 will be described with reference to FIGS. 5 to 10.

Figure 5:
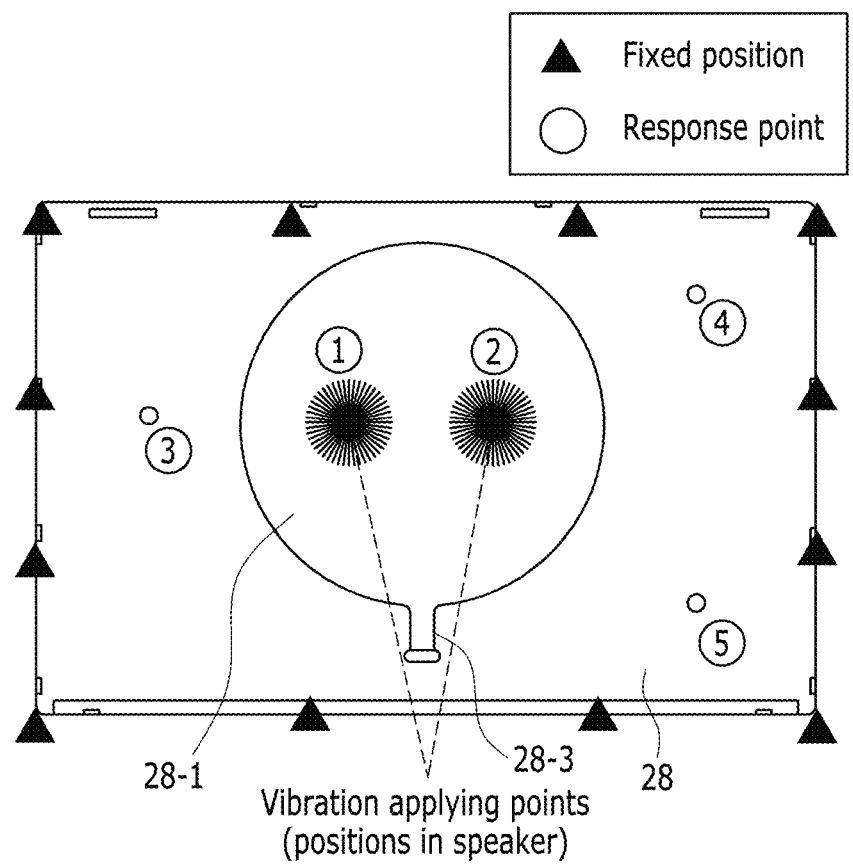
FIGS. 5 to 10 are graphs illustrating characteristics of the display device according to the invention.

FIG. 5 illustrates a measuring position for measuring a sound characteristic and a position of the sound element of the display device 100 according to the invention.

As illustrated in FIG. 5, the display device 100 of for evaluating the sound characteristic uses an exemplary embodiment including two sound elements (e.g., speakers). That is, the two sound elements are positioned near ① and ② of FIG. 5 and inside of the boundary of the protruding portion 28-1 of the rear chassis 28.

The rear chassis 28 is fixed at triangular portions (▲) illustrated in FIG. 5. In FIG. 5, the exemplary embodiment shown in FIG. 3 which excludes the open portion 28-2 at the protruding portion 28-1 is illustrated. During the experimentation, the sound characteristic is measured by using an exemplary embodiment of the display device 100 (e1_base) without the open portion 28-2 as shown in FIG. 3, an exemplary embodiment of the display device 100 (e1_slit in) with the open portion 28-2 inside of the protruding portion 28-1 as shown FIG. 2, and an exemplary embodiment of the display device 100 (e1_slit out) with the open portion 28-2 outside of the protruding portion 28-1 as shown in FIG. 4.

Further, the positions for measuring the sound characteristic are position ①, ②, ③, ④ and ⑤ of FIG. 5, and the sound characteristics at these respective positions are illustrated in FIGS. 6 to 10.

Figure 6:
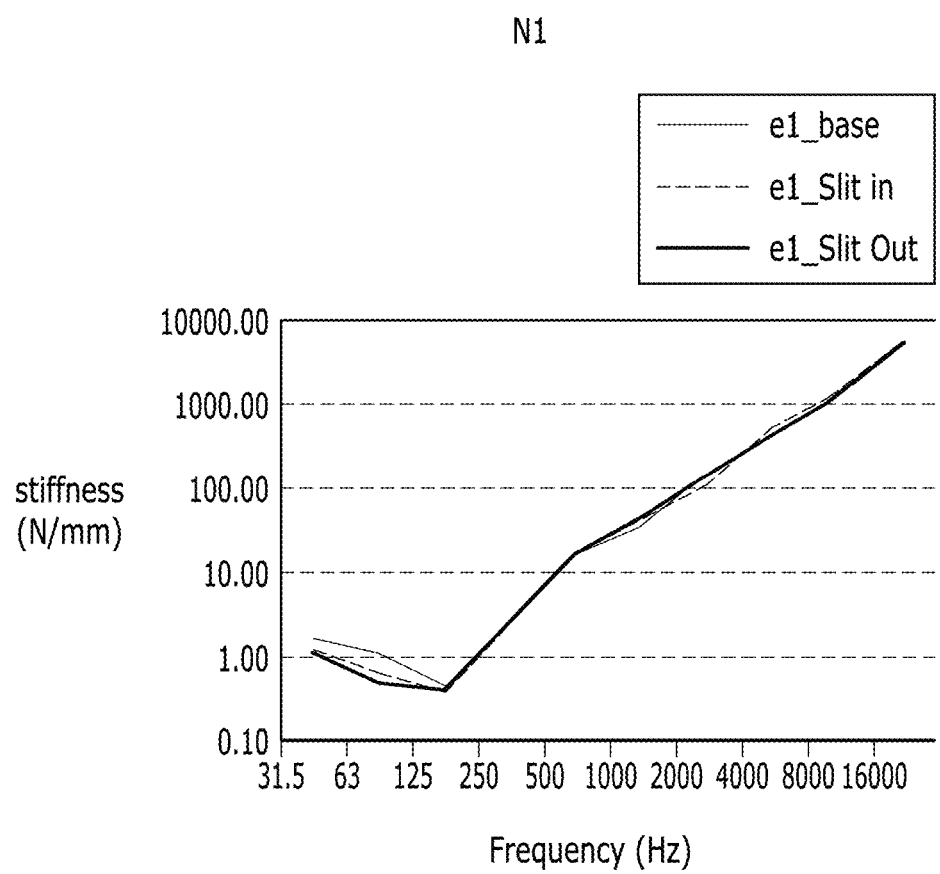
Figure 7:
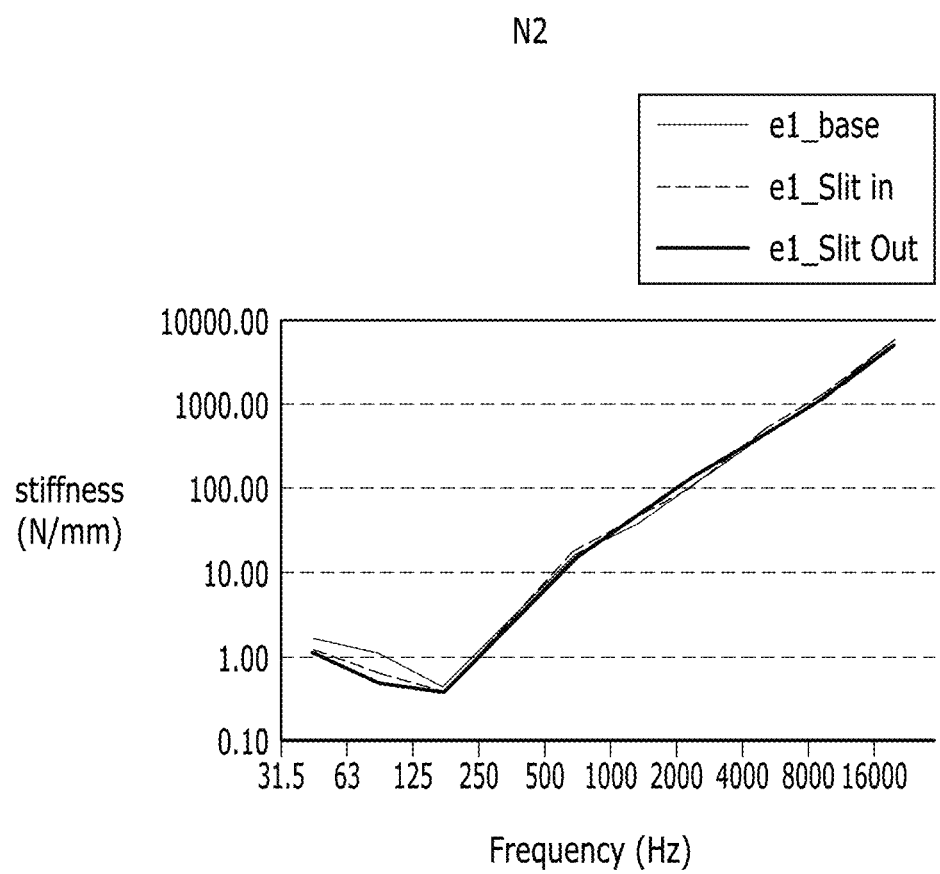
Figure 8:
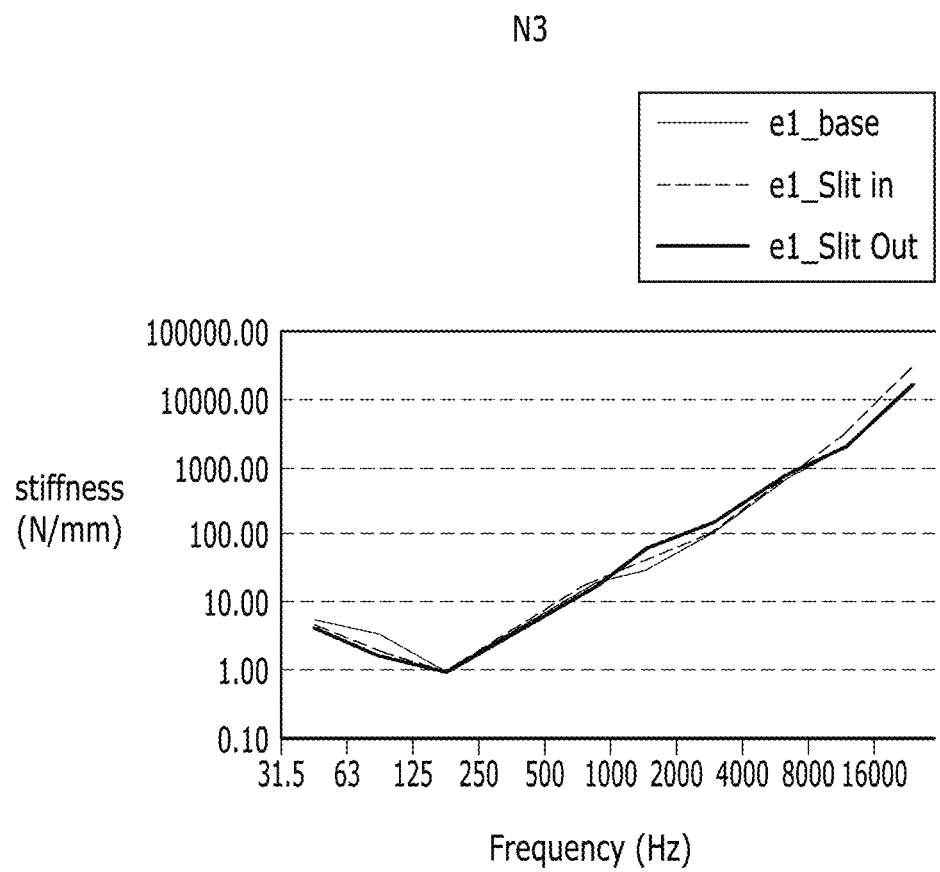
Figure 9:
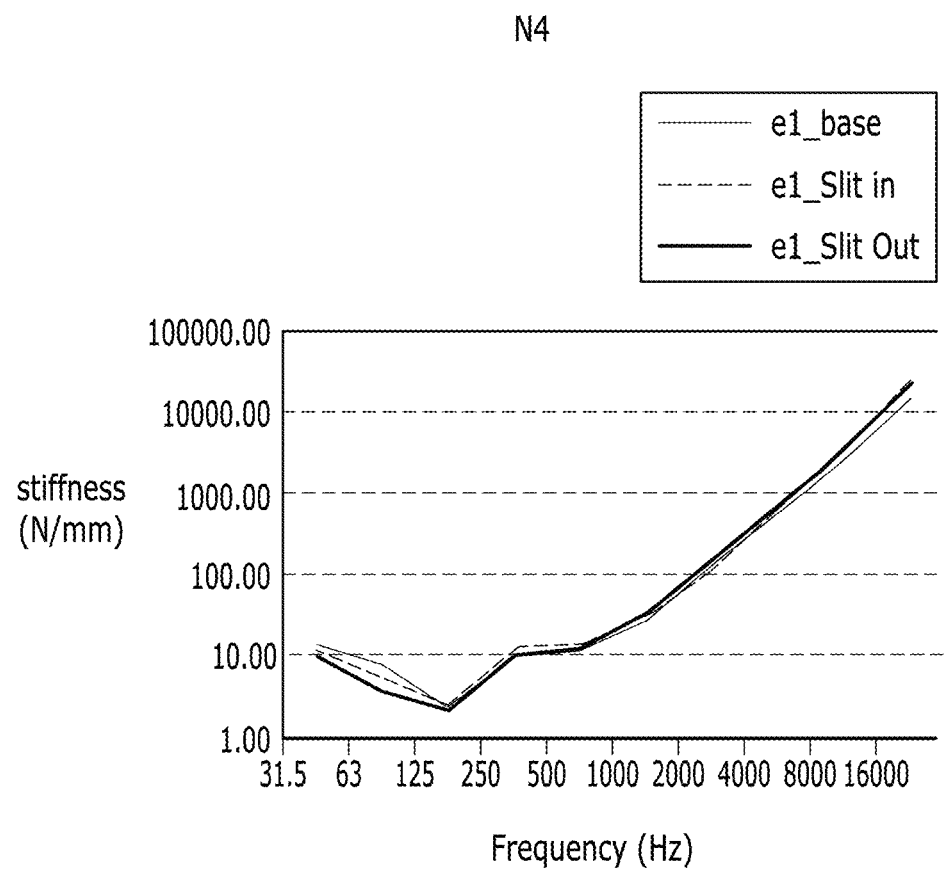
Figure 10:
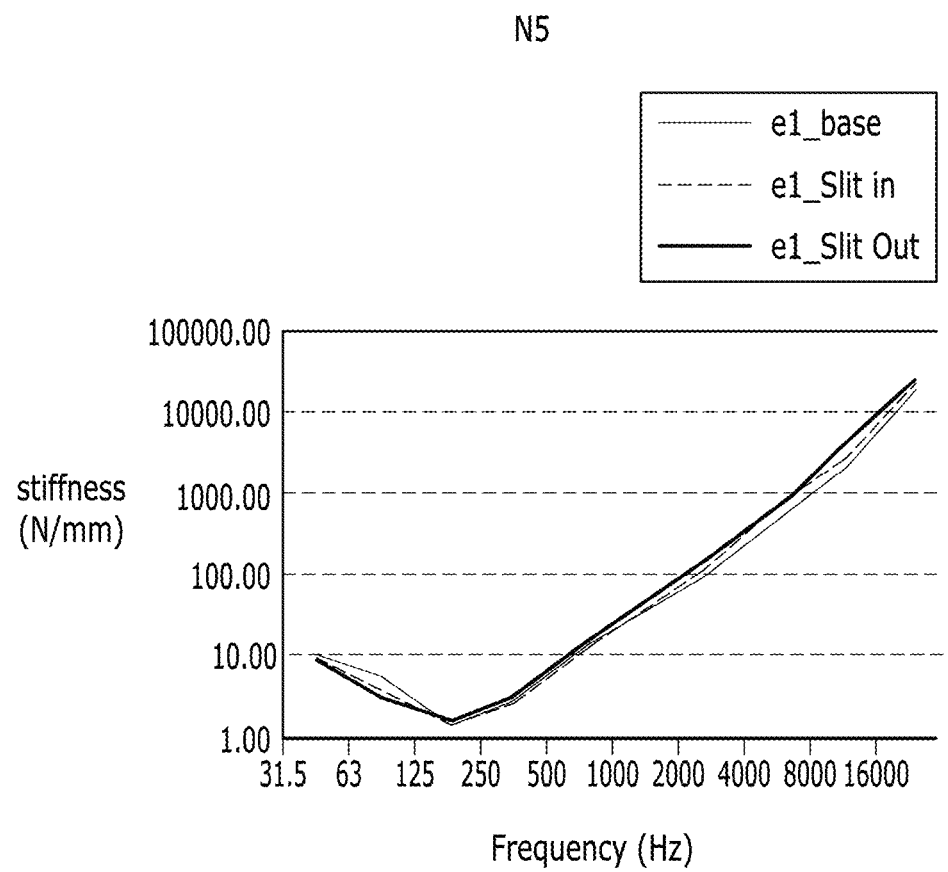

In the exemplary embodiment of FIG. 6, the sound characteristic at position ① is illustrated by a graph N1, in FIG. 7, the sound characteristic at position ② is illustrated by a graph N2, in FIG. 8, the sound characteristic at position ③ is illustrated by a graph N3, in FIG. 9, the sound characteristic at position ④ is illustrated by a graph N4, and in FIG. 10, the sound characteristic at position ⑤ is illustrated by a graph N5. The graphs of FIGS. 6 to 10 illustrate stiffness of the rear chassis (newtons per millimeter: N/mm) with respect to frequency (hertz: Hz). As illustrated by these graphs, when the stiffness becomes relatively small, it is advantageous to amplify the sound.

Referring to FIGS. 6 to 10, the exemplary embodiments of the display device 100 with open portion 28-2 (e1_slit in and e1_slit out) have a better sound amplifying effect than the exemplary embodiment of the display device 100 without the open portion 28-2 (e1_base). In addition, the exemplary embodiment of the display device 100 with the open portion 28-2 outside of the protruding portion 28-1 has a good sound amplifying effect in a low frequency range of about 1 kilohertz (kHz) or less, and a high frequency range of about 3 kHz or more. The exemplary embodiment of the display device 100 with the open portion 28-2 inside of the protruding portion 28-1 has a good sound amplifying effect in a medium frequency range between the low frequency range and the high frequency range described above.

Figure 11:
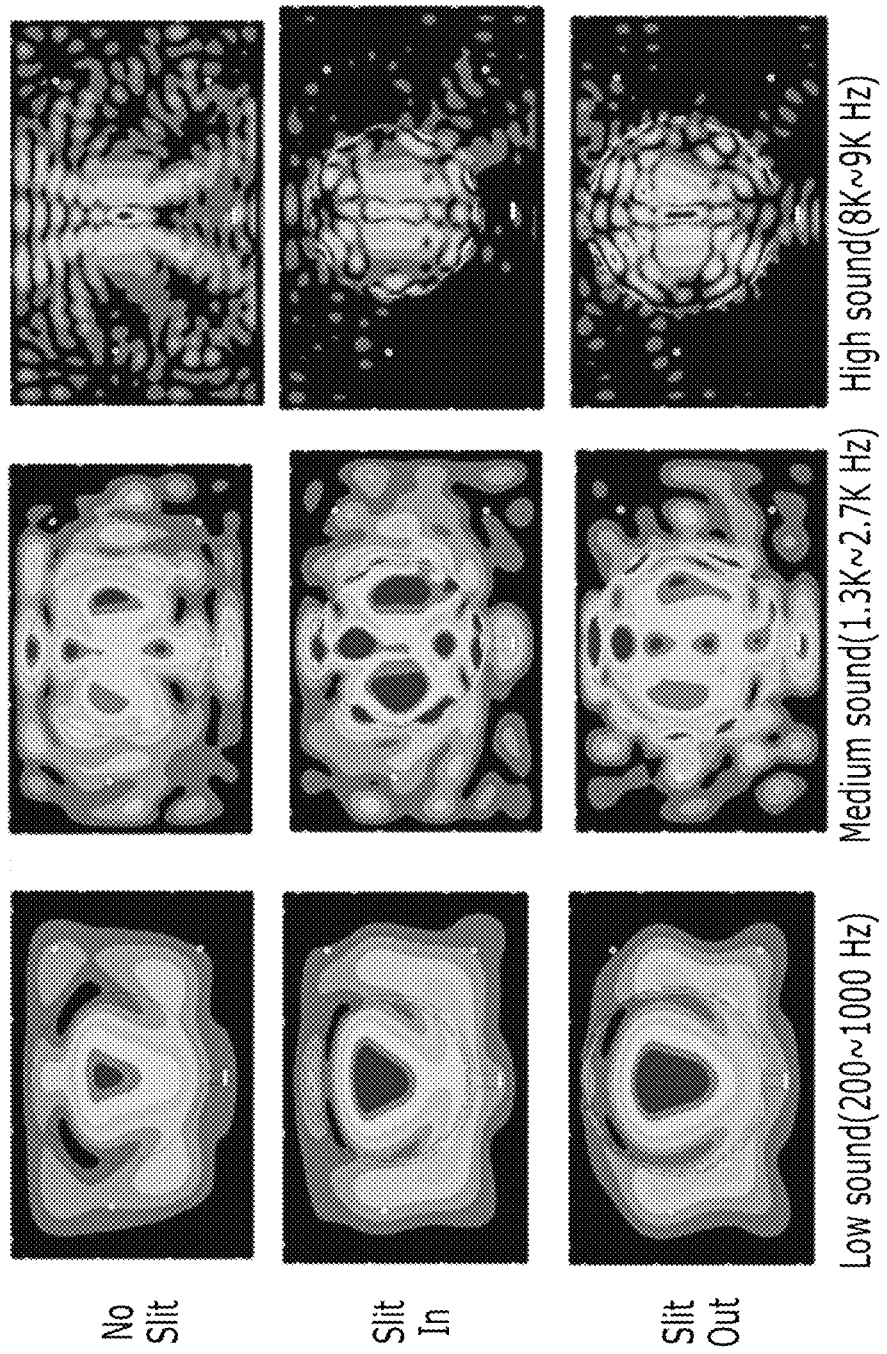
FIG. 11 is photographs showing vibration characteristics of the display device according to the invention.

FIG. 11 illustrates plan view of a result of photographing a vibration characteristic at each frequency range (low sound, medium sound, high sound) after vibrating the exemplary embodiment of the display device 100 (No slit) without the open portion 28-2 as shown in FIG. 3, the exemplary embodiment of the display device 100 (slit in) with the open portion 28-2 inside of the protruding portion 28-1 as shown in FIG. 2, and the exemplary embodiment of the display device 100 (slit out) with the open portion 28-2 outside of the protruding portion 28-1 as shown in FIG. 4.

Referring to FIG. 11, it is verified that the exemplary embodiment of the display device 100 without the open portion 28-2 (No slit) as shown in FIG. 3 has a characteristic that the vibration by the sound element 27 is widely spread to substantially the entire area of the rear chassis 28 and thus the entire rear chassis 28 vibrates.

Further, it is verified that the exemplary embodiment of the display device 100 (slit out) with the open portion 28-2 outside of the protruding portion 28-1 like FIG. 4 has a good sound amplifying effect in a low frequency area (low sound) of 200 kHz to 1 kHz and a high frequency area (high sound) of 8 kHz to 9 kHz. It is verified that the exemplary embodiment of the display device 100 with the open portion 28-2 inside of the protruding portion 28-1 like FIG. 2 has a good sound amplifying effect in a medium sound area of 1.3 kHz to 2.7 kHz.

Therefore, the position of the open portion 28-2 may be controlled according to a frequency characteristic of a main sound of the display device 100, and the open portions 28-2 may be defined inside and/or outside of the protruding portion 28-1.

Hereinafter, various exemplary embodiments according to changes of the number, position and shape of the sound element 27 and the protruding portion 28-1 will be described with reference to FIGS. 12 to 18.

First, various modifications of the protruding portion 28-1 at the rear chassis 28 will be described in FIG. 12.

Figure 12:
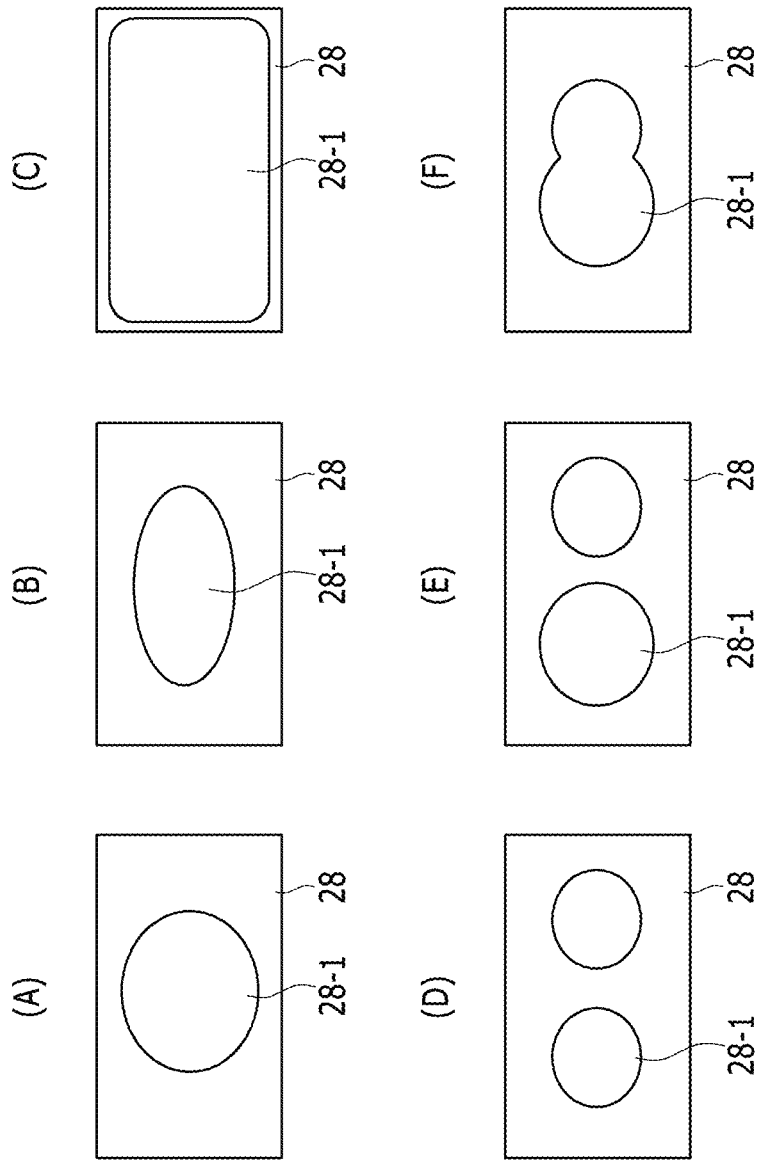
FIGS. 12 and 13 plan views illustrating various exemplary embodiments of the display device according to the invention.

FIG. 12 is a plan view which illustrates various shapes of the protruding portion 28-1. In FIG. 2, the protruding portion 28-1 protrudes in a substantially three-dimensional cylindrical form from the plate portion of the bottom chassis 28, except for the wire connection portion 28-3 is illustrated. In contrast, FIG. 12 illustrates various planar shapes of the protruding portion 28-1 except for the wire connection portion 28-3, which protrude from the plate portion of the bottom chassis 28 to define a three-dimensional form.

The planar shape of the protruding portion 28-1 is illustrated from a rear side of the display device. The planar shapes are shown as various shapes such as a curved shape including, but not limited to, an oval (a) and (b), or a quadrangular structure (c) having round edges in addition to the circular shape. Unlike those shapes illustrated in FIG. 12, a quadrangular structure may have angular edges. The protruding portion 28-1 may also have a polygonal structure having round edges and/or a polygonal structure having angular edges.

The protruding portion 28-1 may include only one shape, such as shown in (a), (b), (c) and (f), however, the invention is not limited thereto or thereby. The protruding portion 28-1 may also include multiple discrete shapes, such as shown in (d) and (e), which each define a three-dimensional form which protrudes from the plate portion of the rear chassis 28.

One sound element 27 may be disposed in the protruding portion 28-1, but two or more sound elements 27 may be disposed as illustrated in FIG. 5. Alternatively, only one sound element 27 may be positioned at the center of the protruding portion 28-1, but the invention is not limited thereto or thereby.

In FIG. 12, the exemplary embodiment in which two protruding portions 28-1 having substantially the same size are disposed at the rear chassis 28 at a regular distance is illustrated in (d), but an exemplary embodiment in which two protruding portions 28-1 having different sizes is illustrated in (e). At least one sound element 27 may be positioned in each protruding portion 28-1, and the at least one sound element 27 may be positioned at the center of the protruding portion 28-1, but the invention is not limited thereto or thereby.

In addition, in FIG. 12, a protruding portion 28-1 having a shape in which two protruding portions 28-1 are overlapped with each other is illustrated in (f). That is, a structure, in which two different circular protruding portions 28-1 are arranged to be partially overlapped with each other to form one continuous and integral protruding portion 28-1, is illustrated. At least one sound element 27 may be positioned in the protruding portion 28-1. Where the two sound elements 27 are positioned, one continuous protruding portion 28-1 is virtually divided into two circular protruding portions as shown in (f), and thus the two sound elements 27 may be positioned at the centers of the circular shapes, respectively.

The shapes of the protruding portion 28-1 illustrated in FIG. 12 illustrate some of the various exemplary embodiments of the invention, and the exemplary embodiment of the invention is not limited to the protruding portions 28-1 of FIG. 12.

Figure 13:
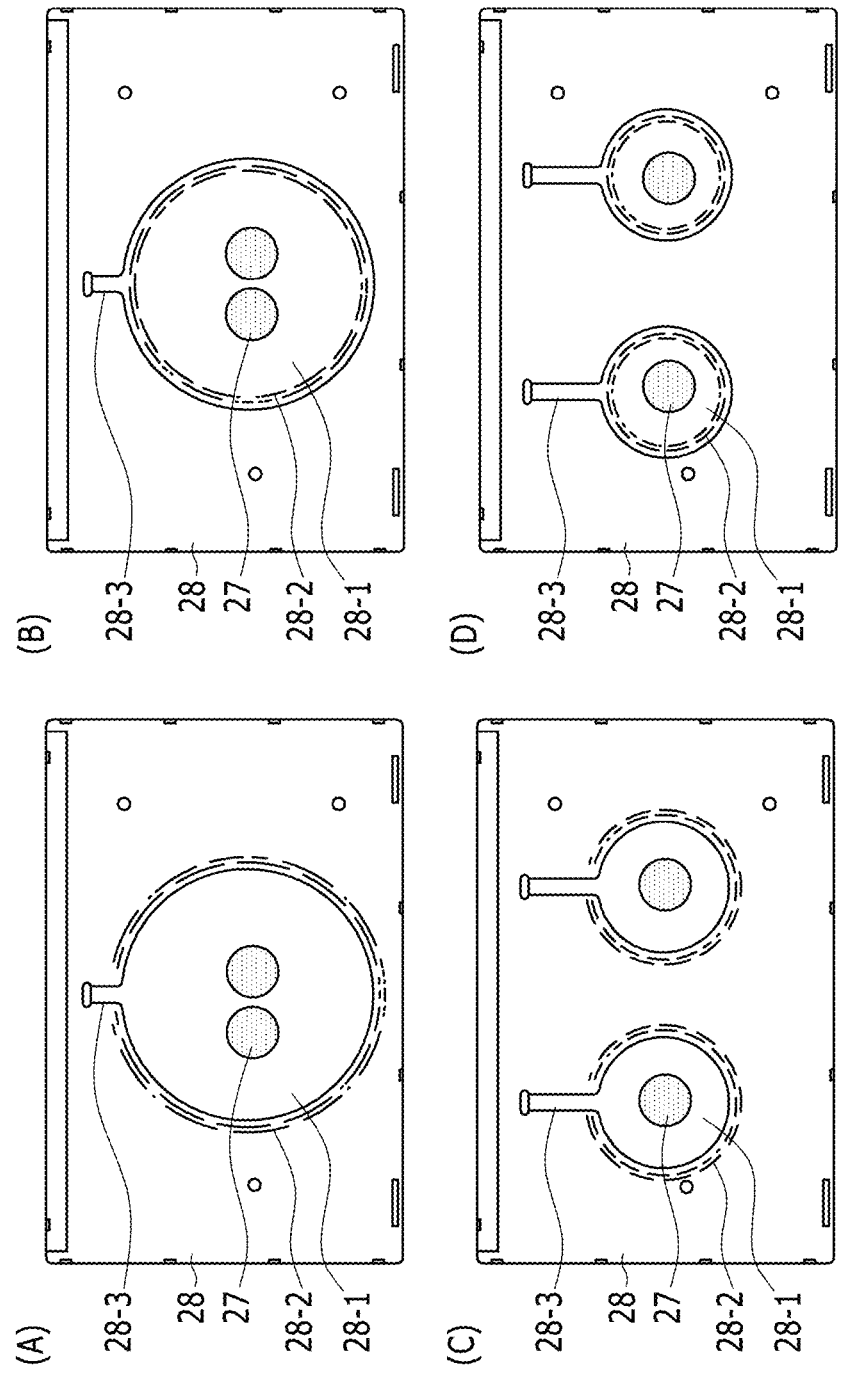

In FIG. 13, a more detailed structure of the rear chassis 28 including the open portion 28-2 and the wire connection portion 28-3 based on the circular protruding portion 28-1 is illustrated. Various exemplary embodiments are illustrated in FIG. 13 according to the position of the open portion 28-2 and the number of protruding portions 28-1. The exemplary embodiment having two sound elements 27 is illustrated in FIG. 13.

First, the exemplary embodiment having one protruding portion 28-1 will be described, with reference to (a) and (b) of FIG. 13. Two sound elements 27 are included in one protruding portion 28-1, and one wire connection portion 28-3 corresponds to one protruding portion 28-1. In one exemplary embodiment (a), the open portion 28-2 is positioned outside of the protruding portion 28-1, and in another exemplary embodiment (b), the open portion 28-2 is positioned inside of the protruding portion 28-1. According to an alternative exemplary embodiment, the open portion 28-2 may not be included in the rear chassis 28.

In the exemplary embodiment in which two protruding portions 28-1 are disposed, one sound element 27 is positioned in each protruding portion 28-1, respectively. The sound element 27 may be positioned at the center of the protruding portion 28-1, but the invention is not limited thereto or thereby. Each protruding portion 28-1 has one wire connection portion 28-3. In one exemplary embodiment (c), the open portions 28-2 are respectively positioned outside of the protruding portions 28-1, and in another exemplary embodiment (d), the open portions 28-2 are respectively positioned inside of the protruding portion 28-1. According to an alternative exemplary embodiment, the open portion 28-2 may not be included in the rear chassis 28. In another alternative exemplary embodiment, one of the open portions 28-2 may be positioned outside and one of the open portions 28-2 may be positioned inside the protruding portions 28-1.

In FIG. 13, the two sound elements 27 are illustrated, and when the two sound elements 27 are used, a stereo sound may be provided to a user.

In the exemplary embodiment of FIG. 13, since only the circular structure among various shapes of the protruding portion 28-1 of FIG. 12 is used, more exemplary embodiments may be arranged when combining the exemplary embodiment of FIGS. 12 and 13. Modified exemplary embodiments which are not illustrated in FIGS. 12 and 13 may be included in the scope of the invention.

In FIGS. 14 to 18, various exemplary embodiments based on an exemplary embodiment of the invention using a cushion member such as a cushion tape 70-1 instead of the rear chassis 28 are illustrated. In the exemplary embodiments of FIGS. 14 to 18, the rear chassis 28 of FIG. 1 may be included in a display panel (or display panel assembly) represented by 70 in FIGS. 14 to 18. That is, the cushion tape 70-1 may be positioned on a rear side of the rear chassis 28, or, an additional rear chassis 28 may be positioned on the rear side of the cushion tape 70-1. Further, in FIGS. 14 to 18, exemplary embodiments of the invention in which the window member 30 is disposed on the front side of the display panel 70 are illustrated by a dotted line. The window member 30 is not a constituent element to be necessarily included, and may include tempered glass or plastic to reduce or effectively prevent damage to the front side of the display panel 70 from the outside. The window member 30 may configure an outer surface of a display side of a portable electronic device such as a portable telephone or other electronic devices.

First, the exemplary embodiment of FIG. 14 will be described.

The display device 100 includes a display panel 70, a sound element 27 positioned at the rear side of the display panel 70, and a cushion element such as a tape 70-1 covering the rear side of the display panel 70 and the sound element 27. According to an exemplary embodiment, a window member 30 may be included at the front side of the display panel 70 or the display panel assembly 70, but the invention is not limited thereto or thereby.

The cushion tape 70-1 serves to protect the rear side of the display panel 70 and the sound element 27. The cushion tape 70-1 may include a material having elasticity and/or may have a black color blocking light.

Figure 14:
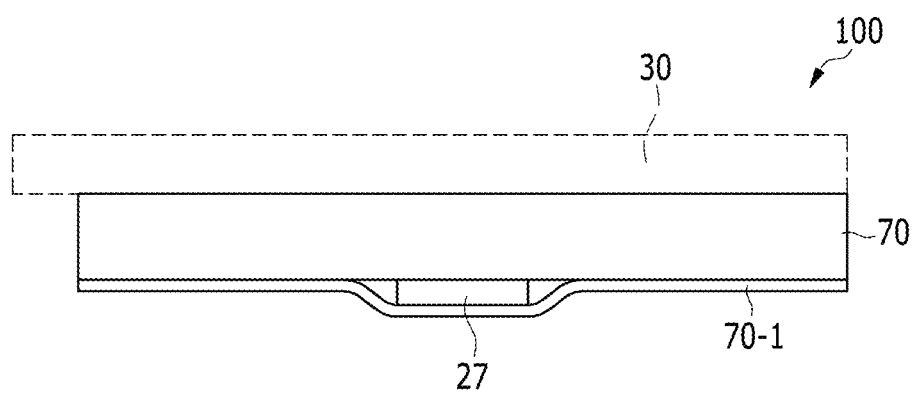
FIGS. 14 to 18 are cross-sectional views illustrating various exemplary embodiments of the display device according to the invention.

With the cushion tape 70-1 attached to the display panel 70 and covering the sound element 27, a predetermined space is defined around the sound element 27 as illustrated in FIG. 14 to serve as a soundbox echoing the sound of the sound element 27. The cushion-tape 70-1 may be spaced apart from the display panel 70 to define the predetermined space.

According to an exemplary embodiment, reference numeral 70 of FIG. 14 may represent the display panel assembly, and not only the display panel. That is, the display panel assembly 70 of FIG. 14 may further include a driver including an IC chip and/or a FPCB to drive a display panel in addition to the display panel.

The display panel 70 or the display panel assembly of the exemplary embodiment of FIG. 14 may be a display panel self-emitting light or a non-emissive display panel receiving light from a light source to display an image. The self-light emitting display panel includes an organic light emitting panel and the like, and the non-emissive display panel includes a liquid crystal panel and the like. The non-emissive display panel may include a backlight unit.

The display panel 70 of FIG. 14 may further include a mold frame, and the display panel may be fixed by the mold frame. In addition, in order to reduce or effectively prevent deviation of the display panel 70 in a front direction, a top chassis may be further included, and a rear chassis called a bottom chassis or back chassis may be further included.

In the exemplary embodiment of FIG. 14, the exemplary embodiment including only one sound element 27 is illustrated, but the number of sound elements 27 may be two or more.

In the exemplary embodiment of FIG. 14, the rear side of the display panel 70 and the sound element 27 directly contact each other. Where the rear side of the display panel 70 is formed as a glass substrate without a separate chassis, the glass substrate may be damaged by directly contacting the sound element 27 and the glass substrate.

Figure 15:
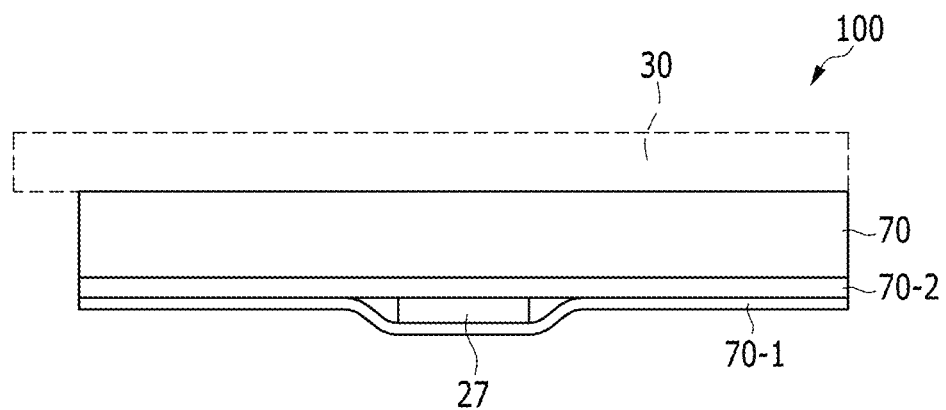

Accordingly, as shown in the exemplary embodiment of FIG. 15, a protective film 70-2 protecting the glass substrate is disposed on the rear side of the display panel 70, and the sound element 27 and the cushion tape 70-1 are disposed therebelow, is also possible.

In the exemplary embodiment of FIGS. 14 and 15, the cushion tape 70-1 covers the sound element 27, and may have a characteristic in which the sound is echoed and amplified by a space defined around the sound element 27.

However, when a height of the sound element 27 is relatively small in a cross-sectional thickness direction of the display device 100, the space with the cushion tape 70-1 is commensurately small and thus may be insufficient to serve as the soundbox.

Hereinafter, an exemplary embodiment in which a sound space 70-11 is defined in the cushion tape 70-1 will be described with reference to FIGS. 16 and 17.

Figure 16:
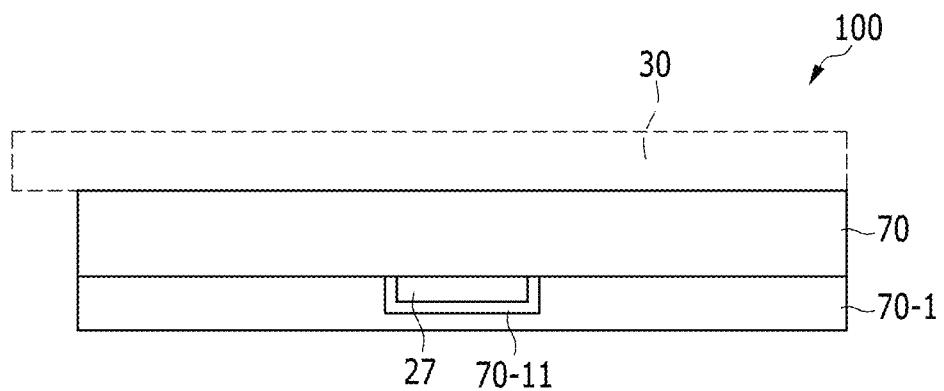

As illustrated in FIG. 16, a sound element 27 borders the rear side of the display panel 70. The cushion tape 70-1 also borders the rear side of the display panel 70 and corresponds to the sound element 27. The cushion tape 70-1 along with the sound element 27 defines the sound space 70-11 which is concave and positioned at the rear side of the display panel 70.

In the above exemplary embodiment, the sound space 70-11 may be defined with a sufficient size according to a need to sufficiently amplify the sound provided from the sound element 27.

Figure 17:
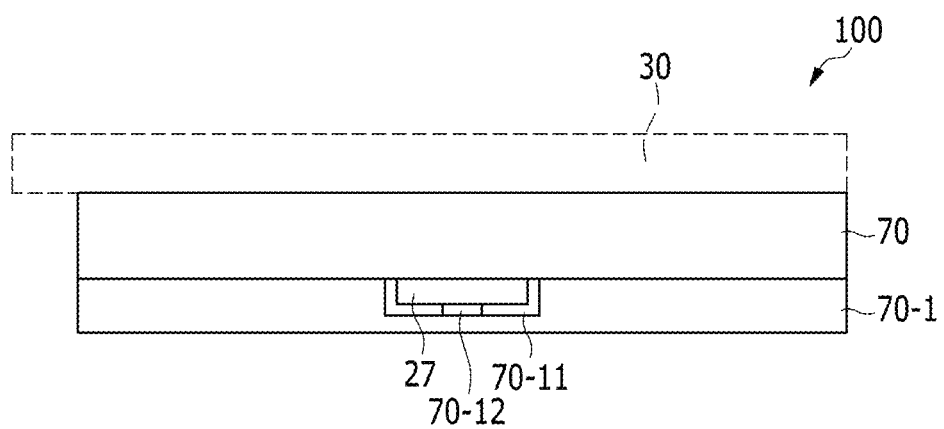
Figure 18:
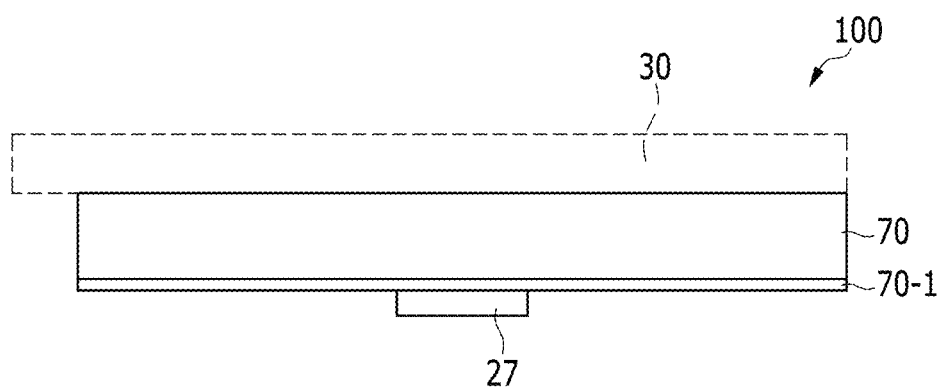

In the exemplary embodiment of FIG. 16, the sound element 27 may be attached onto the rear side of the display panel 70 and remain spaced apart from the cushion tape 70-1, and in FIG. 17, the exemplary embodiment in which the sound element 27 is fixed in the sound space 70-11 and to the cushion tape 70-1 is illustrated.

As illustrated in FIG. 17, a fixing protrusion 70-12 is disposed in the sound space 70-11 defined by the cushion tape 70-1. The fixing protrusion 70-12 may occupy a space between the sound element 27 and the cushion tape 70-1 such that the sound element 27 is held against the display panel 70 and a position of the sound element 27 is maintained with respect to the rear side of the display panel 70. That is, the fixing protrusion 70-12 may be the sole member which maintains the sound element 27 in contact with the display panel 70 (e.g., no further fixing member or adhesive is used). The sound element 27 is fixed in the sound space 70-11 defined by the cushion tape 70-1 via the fixing protrusion 70-12. In the exemplary embodiment of FIG. 17, the cushion tape 70-1 and the fixing protrusion 70-12 may include the same material, but alternatively may include different materials which are attached to each other by an adhesive and the like.

In the exemplary embodiment of FIG. 17, the sound element 27 contacts the rear side of the display panel 70, but may be attached to the rear side of the display panel 70 by an adhesive interposed between the sound element 27 and the display panel 70. The sound element 27 may be pressed and fixed to the rear side of the display panel 70 by the fixing protrusion 70-12. Although the sound element 27 is not attached to the rear side of the display panel 70 by the adhesive, the fixing protrusion 70-12 functions to maintain the position of the sound element 27 with respect to the display panel 70.

According to an exemplary embodiment, an exemplary embodiment having no constituent element covering the sound element 27 is possible. That is, like the display device illustrated in FIG. 18, the sound element 27 is positioned on the rear side of the display panel 70, and no constituent element may be disposed on the rear side thereof. That is, the sound element 27 is exposed to an outside of the display device 100.

Hereinafter, modified examples of the sound element 27 will be described with reference to FIGS. 19 to 22.

FIGS. 19 to 22 are diagrams illustrating various exemplary embodiments of sound elements according to the invention.

First, a sound element 27 of FIG. 19 will be described.

Figure 19:
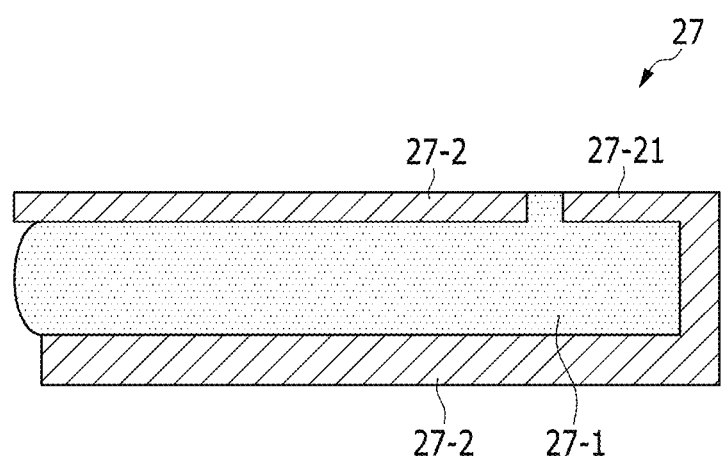
FIGS. 19 to 22 illustrate exemplary embodiments of structures of various sound elements according to the invention.

FIG. 19 illustrates a partial cross-section of a sound element 27. The sound element 27 includes a pair of electrodes 27-2 facing each other and the vibration material layer 27-1 positioned between the electrodes. The vibration material layer 27-1 includes a piezo material which is vibrated by the electric field provided from the pair of electrodes 27-2 above and below the vibration material layer 271. The piezo material may include PVDF or PZT.

An upper electrode 27-2 is positioned above the vibration material layer 27-1, and a lower electrode 27-2 is positioned below the vibration material layer 27-1. In the exemplary embodiment of FIG. 19, a portion of the lower electrode 27-2 extends up the side of the vibration material layer 27-1 to be positioned at above the vibration material layer 27-1. A portion of the lower electrode 27-2 positioned above the vibration material layer 27-1 configures an electrode pad 27-21. In order to apply an electric field to the vibration material layer 27-1, a wire is connected to the two electrodes 27-2. As illustrated in FIG. 19, when the electrode pad 27-21 of the lower electrode 27-2 is positioned above the vibration material layer 27-1, the two electrodes may be directly connected to each other above the vibration material layer 27-1. As a result, although the lower portion of the sound element 27 is attached by an adhesive and the like to the display panel 70 or other element of the display device 100, a signal may be applied through the upper portion of the sound element 27.

Figure 20:
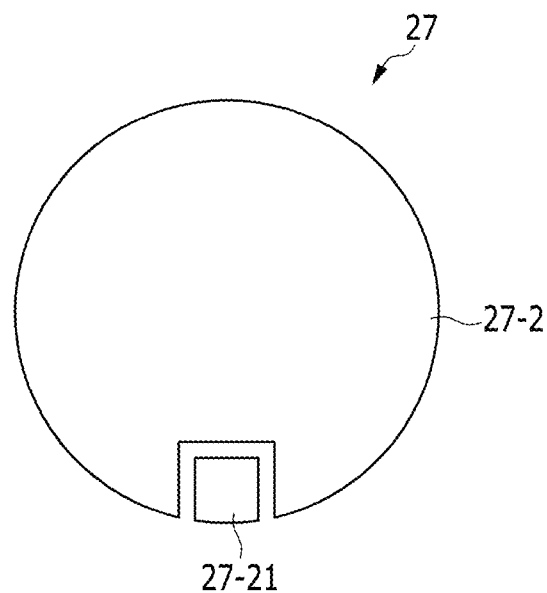

The sound element 27 having a cross-section like FIG. 19 may have a plan view as shown in FIG. 20 when viewed from a top of the sound element 27. A portion of two electrodes 27-2 is positioned at the upper portion of the sound element 27. The upper electrode 27-2 positioned at the upper portion occupies in large planar area of the sound element 27, and the electrode pad 27-21 of the lower electrode 27-2 is positioned only in a relatively small planar area of the sound element 27. The electrode pad 27-21 is separated from the upper electrode 27-2 at a regular distance.

In the exemplary embodiment of FIG. 20, the electrode pad 27-21 has a quadrangular planar structure, and the upper electrode 27-2 has a substantially circular structure except for the electrode pad 27-21 portion. The vibration material layer 27-1 positioned below the upper electrode 27-2 has the substantially circular structure, the lower electrode 27-2 has a circular structure, and the lower electrode 27-2 is connected with the electrode pad 27-21 along the side of the vibration material layer 27-1. The lower electrode 27-2 and the electrode pad 27-21 may form a single, unitary, indivisible electrode member.

As such, a pair of electrodes 27-2 is basically positioned at the upper portion and the lower portion of the sound element 27, and according to an exemplary embodiment, one electrode may be modified and used as another structure or element of the display panel 70 and/or the display device 100.

Figure 21:
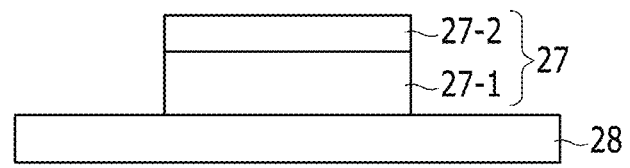

Referring to FIG. 21, the sound element 27 is configured by one upper electrode 27-2 and a vibration material layer 27-1 therebelow. A rear chassis 28 is positioned below the vibration material layer 27-1. The rear chassis 28 includes a conductive material, such that the rear chassis 28 and the one upper electrode 27-2 serve as a pair of electrodes to provide an electric field to the vibration material layer 27-1. That is, in the exemplary embodiment of FIG. 21, where a constituent element to which the sound element 27 is attached includes a conductive material, one electrode of the sound element 27 may be omitted and the constituent element (e.g., the rear chassis 28 in FIG. 21) may serve as an electrode. A constituent element like the rear chassis 28 replacing the electrode may not receive other electric signals except for a signal from the amplifier, but the invention is not limited thereto or thereby.

In the exemplary embodiment of FIG. 21, since the rear chassis 28 serving as the lower electrode of the sound element 27 is much wider than the sound element 27 and thus has many potential positions at which to connect a wire. As a result, the electrode pad 27-21 positioned at the upper portion of the sound element 27 by extending along the side of the vibration material layer 27-1 as illustrated in FIGS. 19 and 20, may not be separately disposed.

Hereinafter, a multilayered sound element 27 will be described with reference to FIG. 22.

Figure 22:
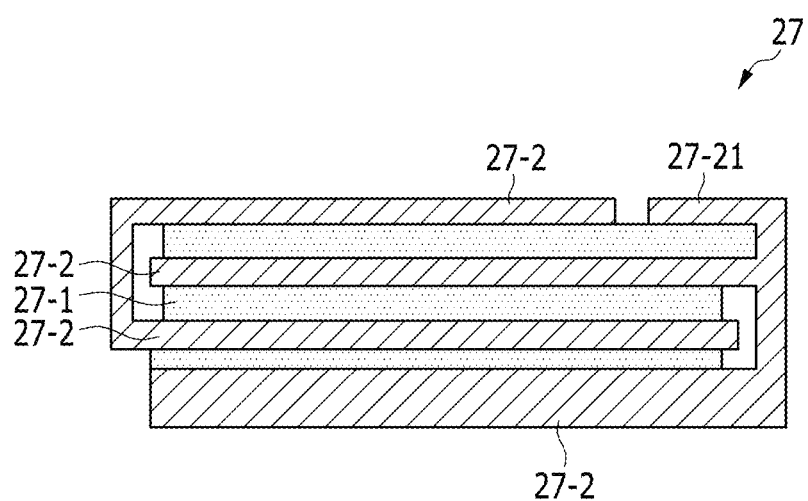

The sound element 27 according to the exemplary embodiment of FIG. 22 includes three vibration material layers 27-1 and a total of four electrodes 27-2 which respectively face each other. The three vibration material layers 27-1 are arranged in a three-layered structure, and the four electrodes 27-2 are positioned at the outmost side of the sound element 28 and between the vibration material layers 27-1 having the three-layered structure. The total of four electrodes 27-2 are electrically connected with each other two by two, and alternately disposed with each other in a cross-sectional direction of the sound element 27. Two electrodes 27-2 electrically connected to each other, may collectively form a single, unitary, indivisible electrode member.

A lowermost electrode 27-2 and an uppermost electrode 27-2 receive different signals, and a middle electrode 27-2 is connected with the uppermost electrode 27-2 or the lowermost electrode 27-2 by extending along the side of the vibration material layer 27-1. That is, connected electrodes which are different planes of the sound element 27 than each other, are connected to each other by extending along the side of the vibration material layer 27-1. The lowermost electrode 27-2 is configured so that the electrode pad 27-21 is positioned space apart from and beside the uppermost electrode 27-2 to be easily connected with the wire. As a result, since the electrodes 27-2 connected by the vertical portions thereof apply different signals, the vibration material layers 27-1 vibrate to generate the sound. In the exemplary embodiment of FIG. 22, the three vibration material layers 27-1 may generate high sound pressure as compared with only one vibration material layer 27-1.

Hereinafter, an amplifier 80 providing a signal to the sound element 27 will be described with reference to FIGS. 23 and 24.

Figure 23:
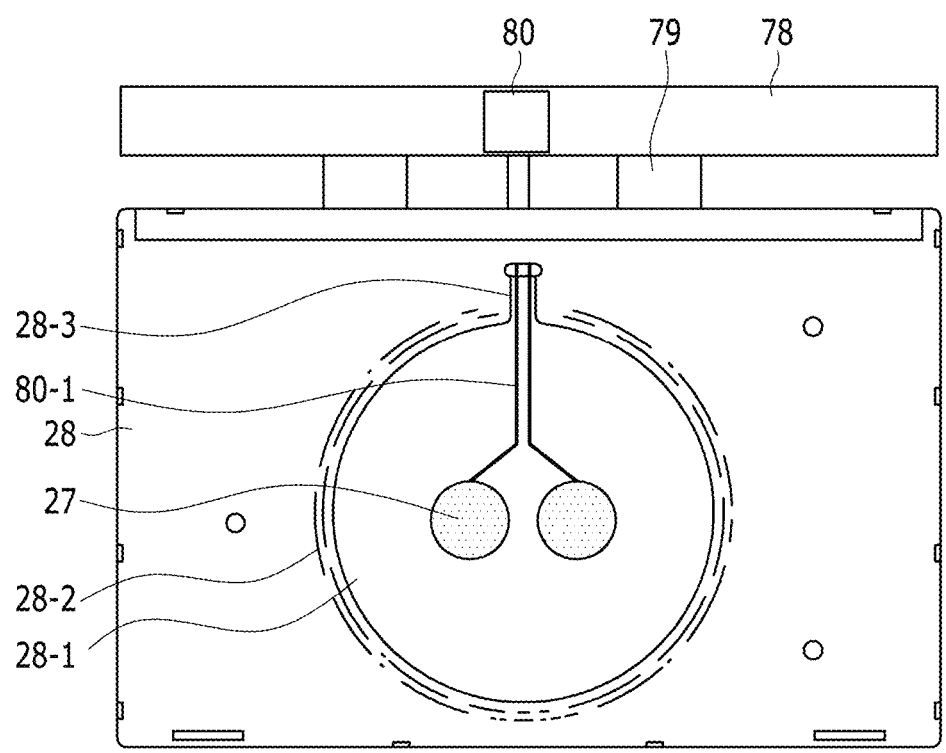
FIGS. 23 and 24 are diagrams illustrating an exemplary embodiment of a display device including an amplifier according to the invention.
Figure 24:
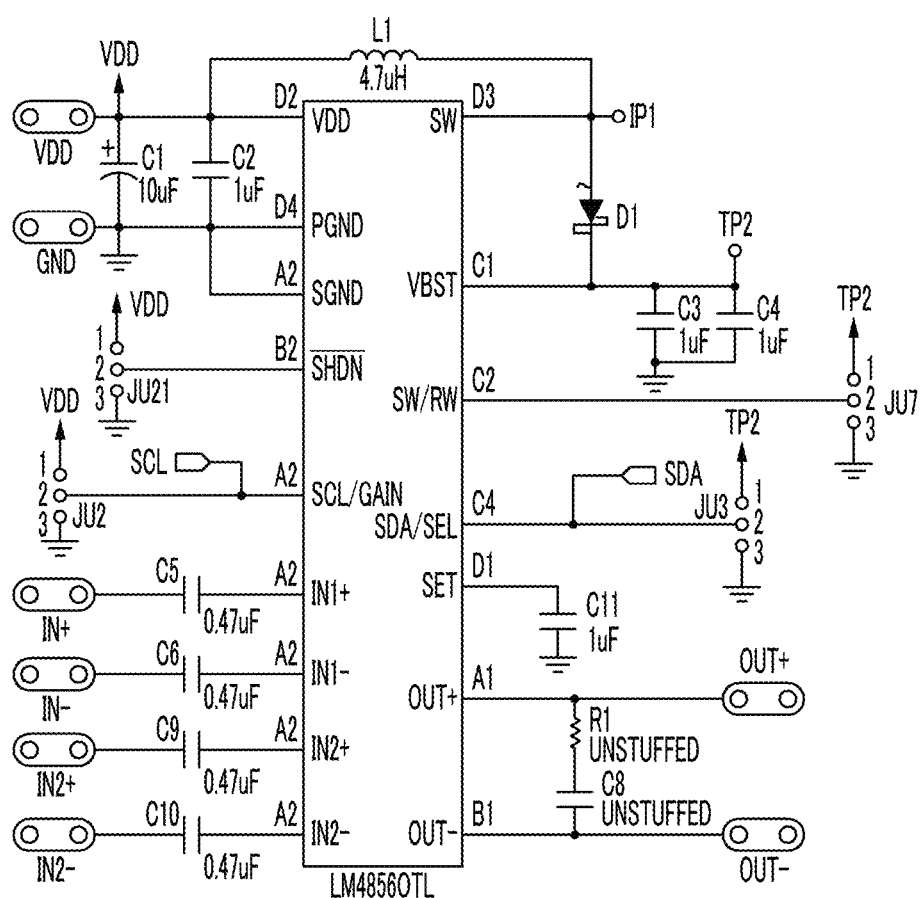

FIGS. 23 and 24 are diagrams illustrating an exemplary embodiment of a display device including an amplifier according to the invention.

In the exemplary embodiment of the display device 100 according to the invention, the amplifier 80 is positioned on a printed circuit board 78. The amplifier 80 may be positioned in a signal controller (not illustrated) controlling image display of the display device 100 and may be separately formed. FIGS. 23 and 24 illustrate a separately configured exemplary embodiment, but the invention is not limited thereto or thereby.

An output of the amplifier 80 is transferred to the display panel 70 along a FPCB 79, and a signal is applied to the sound element 27 through a sound signal wire 80-1 disposed at the display panel 70.

The amplifier 80 receives a sound signal received from outside and amplifies the received sound signal to transfer the amplified sound signal to the sound element 27 through the sound signal wire 80-1.

The amplifier 80 may be implemented by various ICs, and an exemplary embodiment among the integrated circuits is illustrated in FIG. 24.

The amplifier 80 includes one IC chip, and further includes a coil, a capacitor, and a resistor element around the amplifier. When describing a structure illustrated in FIG. 24, one IC chip has a total of 16 input and output terminals. The input and output terminals include one power voltage input terminal VDD, two ground voltage input terminals PGND and SGND, two predetermined voltage input terminals SW and VBST, four input signal terminals IN1+, IN1−, IN2+, and IN2−, two output signal terminals OUT+ and OUT−, and four selection signal input terminals SHDN, SCL/GAIN, SW/RW, and SDA/SEL. Four input signals are amplified and converted according to a signal selected by the four selection signal input terminals to be provided to the two output terminals.

A sound signal applied to the amplifier 80 is provided from the outside of the display device 100, and in the case of a portable terminal or portable electronic device which a user personally transports, the sound signal may be provided from a control unit MPU of the portable terminal to the amplifier 80.

Hereinafter, an exemplary embodiment of a function of the sound element 27 as a drivable characteristic of the display device 100 other than a function of providing sound to the user of an electronic device will be described.

FIGS. 25 to 29 are diagrams illustrating exemplary embodiments of usable driving characteristics of a display device according to the invention.

Figure 25:
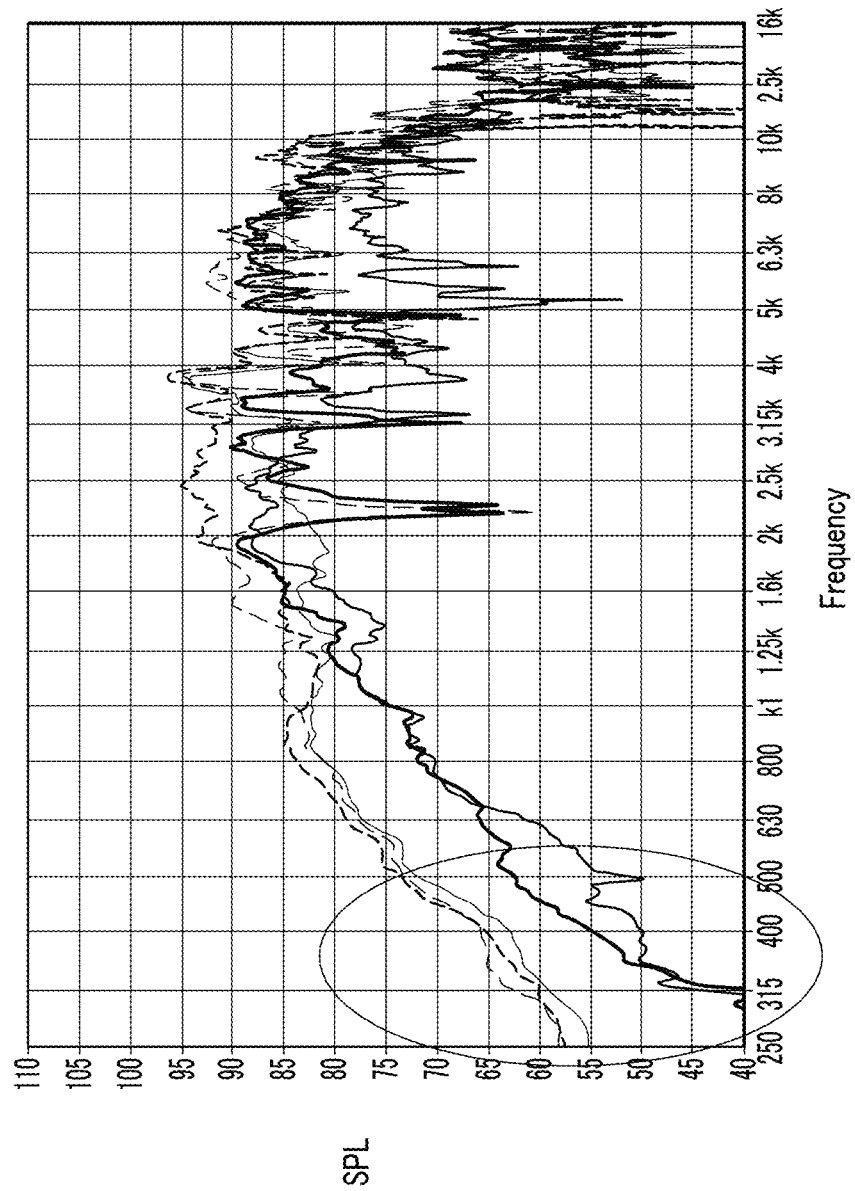
FIGS. 25 to 29 are diagrams illustrating usable driving characteristics of the display device according to the invention.

First, in FIG. 25, a haptic function of the display device to provide tactile feedback by taking advantage of the sense of a touch by applying forces, vibrations or motions, may be employed by using a frequency other than an audible frequency due to vibration of the sound element 27. The graph of FIG. 25 illustrates a sound pressure level (SPL) with respect to a frequency in hertz.

Vibration may be entirely generated in the display device 100 by the sound element 27. Low vibration at a frequency other than an audible frequency is also generated in the display device 100, as indicated by the circled portion of the graph in FIG. 25. Since the user does not hear the frequency other than an audible frequency, although this lower frequency is present in the display device 100, there is no impact on sound quality of the display device 100.

In one exemplary embodiment, when the user applies a force or motion, e.g., touches, the display device 100, the touch may be sensed by sensing changed vibration. The sensing of the touch may be detected by the degree of a touch or whether there is even a touch present. According to an exemplary embodiment, a haptic function may be used in the display device 100 together with an audible frequency function for a sound function. That is, the haptic function of the display device 100 may be implemented by detecting a force or motion applied to the display panel 100 to sense the touch by using the vibration at a non-audible frequency other than the audible frequency provided by the sound element 27, and verifying a touch or not of the user. To this end, a sensor capable of sensing vibration of a low, non-audible frequency other than the audible frequency may further be included in the display device 100. The haptic function of the display device 100 may be implemented by using the sensor and a signal controller which displays an image in the display device 100 and/or a control unit MPU of the portable terminal.

Hereinafter, a function of a pressure sensing sensor will be described with reference to FIG. 26.

The vibration material layer 27-1 included in the sound element 27, vibrates by an electric field applied thereto, to generate a sound. However, where the vibration material layer 27-1 vibrates without the electric field, an electrical voltage is generated from the vibration material layer 27-1. The vibration material layer 27-1 may vibrate without the electric field when the user applies a force (F in FIG. 26), e.g., touches, the display device 100. When the generated voltage is sensed, a displacement generated at the vibration material layer 27-1 may be detected and verified, and such displacement is thereby generated by pressure to serve in a function of sensing a pressure.

In order to sense the pressure using the sound element 27, a sensor 85 capable of sensing voltage generated from the sound element 27 may be further included in the display device 100 or companion element. However, according to an alternative exemplary embodiment, the amplifier 80 may also serve as a pressure sensor by changing a structure of the amplifier 80 and driving the amplifier 80 and the sensor 85 in time division.

Figure 27:
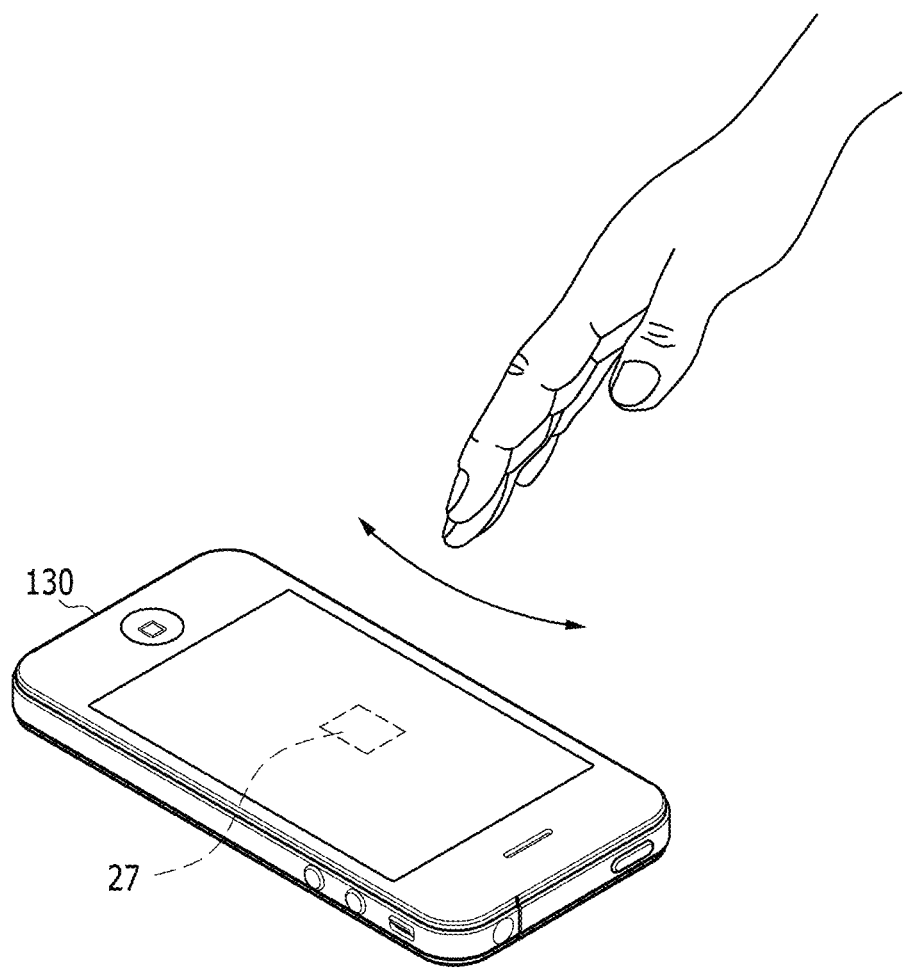

FIG. 27 illustrates an exemplary embodiment in which movement of a user's hand is sensed by using Doppler's effect.

Figure 28:
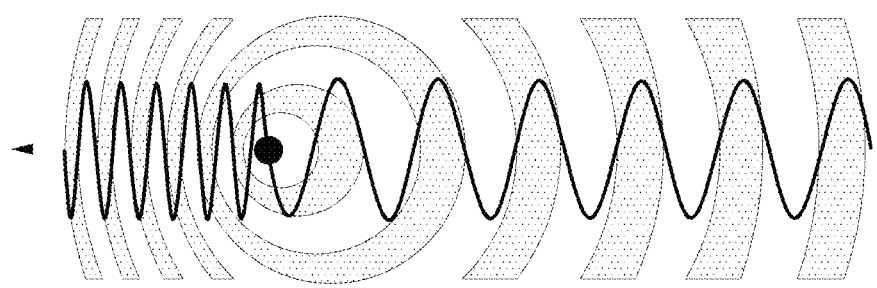

When a high frequency or low frequency sound wave other than the audible frequency is generated at the sound element 27 positioned in the display device 100, the user applies a force such as by moving a hand thereof relative to the front of the display device 100 such that the generated sound wave is changed. Such a sound wave is input to a sound input terminal such as a microphone 130 of the portable terminal or portable electronic device. As illustrated in FIG. 28, while the sound pressure is larger or smaller by a Doppler's effect due to the movement of the user's hand, the sound wave is transferred to the microphone 130 and a change of the sound wave provided to the microphone 130 is sensed. As a result, motion sensing via the change of the sound wave, which effectively senses the movement of the user's hand via the change in the sound wave, is possible.

In order to perform the motion sensing by using the sound element 27, the microphone 130 is employed. When the display device 100 including the sound element 27 is included in the portable terminal or portable electronic device including the microphone 130, the motion sensing is possible without a separate additional constituent element.

In the exemplary embodiment of the invention, since image processing by a camera to detect motion is not necessary and only the sound pressure input to the microphone 130 is considered to detect motion, there is an advantage in that the motion sensing of FIG. 27 is simple.

Figure 29:
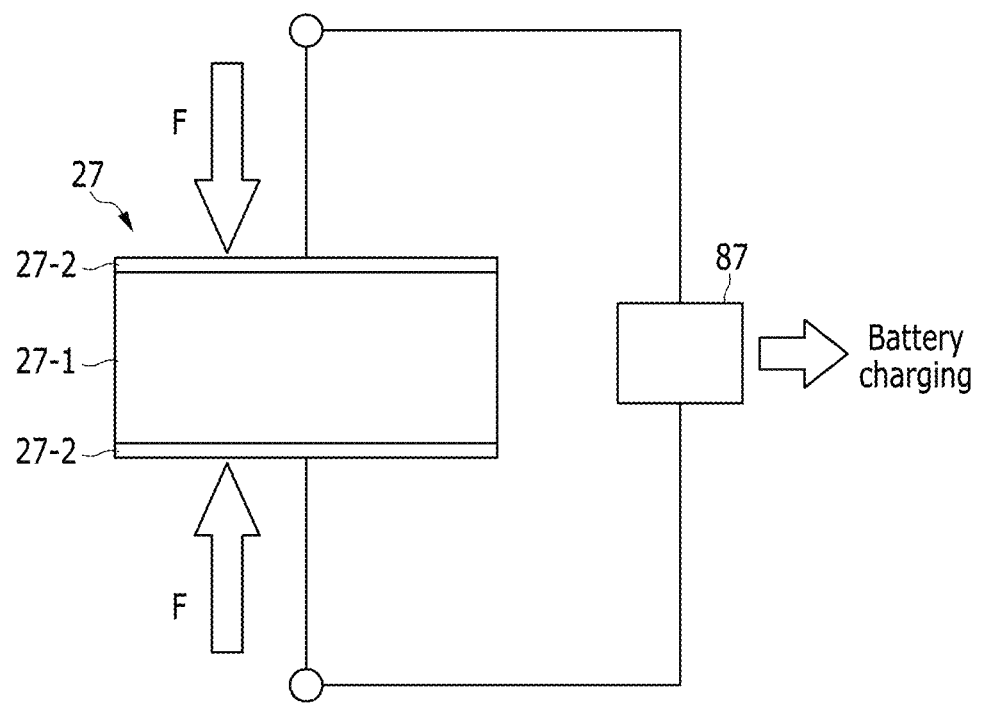

Hereinafter, a battery charging function of a portable electronic device using the sound element 27 functioning as a pressure sensing sensor will be described with reference to FIG. 29.

Figure 26:
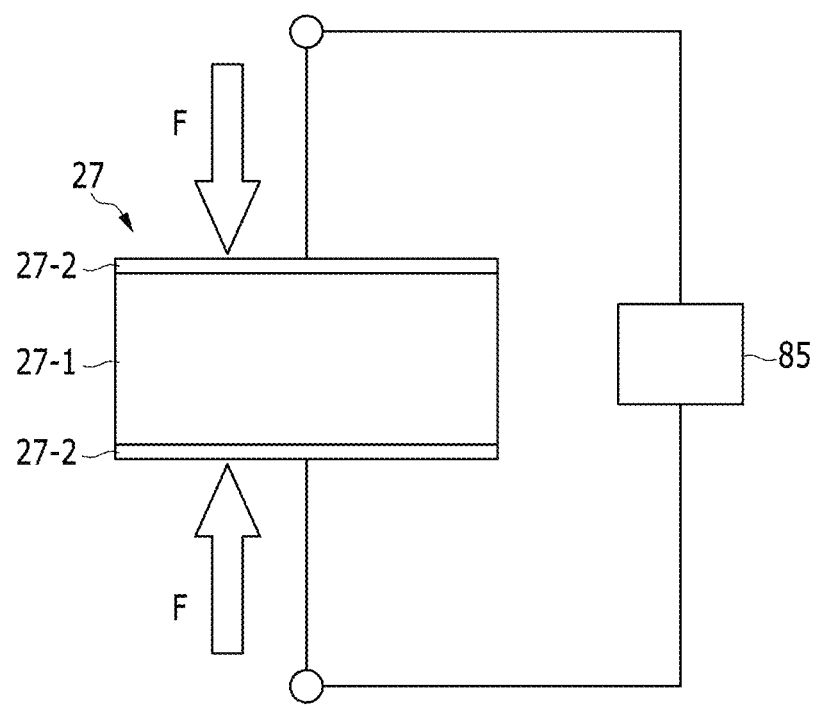

As illustrated in FIG. 26, when the vibration material layer 27-1 included in the sound element 27 vibrates without the electric field such as when the user applies a force (F in FIG. 29), e.g., touches, the display device 100, voltage is generated from the vibration material layer 27-1. Referring to FIG. 29, the generated voltage may be stored in a capacitor or a battery 87 and a use time of the battery 87 may be increased. Generally, by a user transporting or moving the portable terminal or portable electronic device, the portable terminal is exposed to a predetermined level of vibration. Therefore, when the sound element 27 is included in the portable terminal, the sound element 27 vibrates by virtue of the user just transporting the portable terminal and the voltage is generated. Where the generated voltage is transferred to the battery 87, the battery 87 may be charged by virtue of the user just transporting the portable terminal.

In addition, when the portable terminal is not charged in a passive mode by the user merely transporting the portable terminal, the user may actively charge the portable terminal such as by shaking the portable terminal including the sound element 27 and/or by purposely touching the portable terminal a number of times such as by using a finger to vibrate the sound element, and as a result, the battery 87 may be charged in an active charging mode.

As such, another function of the sound element 27 described with reference to FIGS. 25 to 29 may be performed together through time division driving while the sound element 27 provides the sound by using one first sound element 27. Alternatively, one or more separate second sound element 27 is additionally disposed in the display device 100, where such second sound element 27 is not connected to the amplifier, but is instead connected to a separate sensor and/or battery, and as a result, only a sensing operation or battery charging operation may be performed by the one or more second sound element 27.

In previous exemplary embodiments of the invention, the sound element 27 is positioned in the display device 100. However, in order to represent the driving characteristics of the display device 100 with reference to FIGS. 25 to 29, the sound element 27 may be included at some place of the portable terminal in which the display device 100 is used such that the sound element is not necessarily positioned within the display device 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
a display panel configured to display an image;
a rear chassis configured to protect a rear side of the display panel, the rear chassis defining:
an opening, and
a wire connection portion which is protruded from a rear side of the rear chassis; and
a sound element configured to provide a sound, disposed on the rear side of the display panel and at a corresponding position to the opening;
wherein
the sound element comprises a pair of electrodes, and a vibration material layer which is between the electrodes, and
at least one of the pair of electrodes receives a first sound signal through the wire connection portion defined by the rear chassis.

2. The display device of claim 1, further comprising:
a window disposed on a viewing side of the display panel, and
a cushion member configured to protect the rear side of the display panel.

3. A display device comprising:
a display panel configured to display an image;
a rear chassis configured to protect a rear side of the display panel and having an opening;
a sound element configured to provide a sound, disposed on the rear side of the display panel and at a corresponding position to the opening;
a window disposed on a viewing side of the display panel;
a cushion member configured to protect the rear side of the display panel, and
a fixing member which is between the sound element and the cushion member, and attaches the sound element to a rear side of the cushion member,
wherein
the sound element comprises a pair of electrodes, and a vibration material layer which is between the electrodes,
the rear chassis further includes a wire connection portion,
at least one of the pair of electrodes receives a first sound signal through the wire connection portion, and
the fixing member comprises non-conductive epoxy.

4. The display device of claim 1, wherein the rear chassis is configured to receive the display panel and protect the rear side of the display panel.

5. A display device comprising:
- a display panel configured to display an image;
- a rear chassis configured to protect a rear side of the display panel and having an opening;
- a sound element configured to provide a sound, disposed on the rear side of the display panel and at a corresponding position to the opening;
- a window disposed on a viewing side of the display panel, and
- a cushion member configured to protect the rear side of the display panel wherein
- the sound element comprises a pair of electrodes, and a vibration material layer which is between the electrodes,
- the rear chassis further includes a wire connection portion,
- at least one of the pair of electrodes receives a first sound signal through the wire connection portion, and
- the cushion member is disposed at a rear side of the rear chassis.

6. The display device of claim 2, wherein the cushion member includes a material having elasticity or has a black color blocking light.

7. The display device of claim 1, wherein the pair of electrodes of the sound element comprises:
- a first electrode on a first side of the vibration material layer,
- a second electrode on an opposing second side of the vibration material layer, and
- an electrode pad defined by a portion of the first or second electrode, the portion extended along a side of the vibration material layer.

8. The display device of claim 1, wherein
- the sound element further includes a plurality of vibration material layers and a plurality of electrodes,
- the plurality of vibration material layers are arranged in a multi-layered structure and alternate with the plurality of electrodes, and
- the plurality of electrodes are respectively at opposing outermost sides of the sound element and between adjacent vibration material layers.

9. The display device of claim 8, wherein the sound element further includes an electrode pad defined by a portion of an outermost electrode among the outermost electrodes, the portion extended along an outermost side of the plurality of vibration material layers.

10. The display device of claim 9, wherein
- the plurality of electrodes includes a first electrode group electrically connected each other, and a second electrode group electrically connected each other,
- the first electrode group and the second electrode group are not electrically connected each other, and
- an electrode in the first electrode group and an electrode in the second electrode group are alternately arranged.

11. The display device of claim 5, further comprising:
- an amplifier configured to amplify a second sound signal applied from outside the sound element; and
- a sound signal wire which transfers the second sound signal from the amplifier to the sound element.

12. The display device of claim 11, wherein
- the display panel comprises a substrate, a printed circuit board and a flexible printed circuit board,
- the substrate is connected with the printed circuit board through the flexible printed circuit board, and
- the amplifier is on the printed circuit board.

13. The display device of claim 1, further comprising:
- an amplifier configured to amplify a second sound signal applied from outside the sound element; and
- a sound signal wire which transfers the second sound signal from the amplifier to the sound element.

14. The display device of claim 13, wherein
- the display panel comprises a substrate, a printed circuit board and a flexible printed circuit board,
- the substrate is connected with the printed circuit board through the flexible printed circuit board, and
- the amplifier is on the printed circuit board.

15. The display device of claim 13, wherein the sound signal wire is connected to the sound element through the wire connection portion.

16. The display device of claim 1, wherein
- the rear chassis further defines a protruding portion, and
- the wire connection portion protrudes in a cross-sectional direction at substantially a same distance as the protruding portion.

17. The display device of claim 16, wherein
- the sound element is disposed at an inside of the protruding portion of the rear chassis, and
- the wire connection portion is connected to the inside of the protruding portion at which the sound element is disposed.

* * * * *